US012433902B2

(12) United States Patent
Konduri et al.

(10) Patent No.: US 12,433,902 B2
(45) Date of Patent: Oct. 7, 2025

(54) LIPOSOMAL FORMULATIONS FOR INHIBITING SARS-CoV-2 REPLICATION AND REDUCING LUNG INFLAMMATION

(71) Applicant: VGSK Technologies, Inc., Madison, WI (US)

(72) Inventors: Kameswari S. Konduri, Madison, WI (US); Ram Pattisapu, Madison, WI (US); Jogi Pattisapu, Madison, WI (US); John Zwetchkenbaum, Madison, WI (US)

(73) Assignee: VGSK Technologies, Inc., Madison, WI (US)

( * ) Notice: Subject to any disclaimer, the term of this patent is extended or adjusted under 35 U.S.C. 154(b) by 0 days.

(21) Appl. No.: 18/120,770

(22) Filed: Mar. 13, 2023

(65) Prior Publication Data

US 2023/0270756 A1 Aug. 31, 2023

Related U.S. Application Data

(63) Continuation of application No. PCT/US2022/027838, filed on May 5, 2022.

(60) Provisional application No. 63/184,580, filed on May 5, 2021.

(51) Int. Cl.
| | |
|---|---|
| *A61K 31/58* | (2006.01) |
| *A61K 9/127* | (2006.01) |
| *A61K 31/573* | (2006.01) |
| *A61K 45/06* | (2006.01) |
| *A61P 31/14* | (2006.01) |

(52) U.S. Cl.
CPC .............. *A61K 31/58* (2013.01); *A61K 9/127* (2013.01); *A61K 31/573* (2013.01); *A61K 45/06* (2013.01); *A61P 31/14* (2018.01)

(58) Field of Classification Search
None
See application file for complete search history.

(56) References Cited

U.S. PATENT DOCUMENTS

| | | | |
|---|---|---|---|
| 5,013,556 A | 5/1991 | Woodle et al. | |
| 5,356,633 A | 10/1994 | Woodle et al. | |
| 5,824,761 A | 10/1998 | Bujanowski et al. | |
| 5,891,468 A | 4/1999 | Martin et al. | |
| 5,958,378 A | 9/1999 | Waldrep et al. | |
| 5,965,434 A | 10/1999 | Wolff et al. | |
| 6,197,333 B1 | 3/2001 | Onyuksel et al. | |
| 6,203,822 B1 | 3/2001 | Schlesinger et al. | |
| 6,461,591 B1 | 10/2002 | Keller et al. | |
| 6,562,371 B1 | 5/2003 | Kawahara et al. | |
| 6,566,324 B2 | 5/2003 | Nadel et al. | |
| 6,660,525 B2 | 12/2003 | Martin et al. | |
| 6,824,761 B1 | 11/2004 | Hills et al. | |
| 8,062,662 B2 | 11/2011 | Lasic et al. | |
| 8,846,079 B1 | 9/2014 | Konduri et al. | |
| 11,324,698 B2 | 5/2022 | Konduri et al. | |
| 2002/0009488 A1 | 1/2002 | Francis et al. | |
| 2002/0106330 A1 | 8/2002 | Waldrep et al. | |
| 2002/0110587 A1 | 8/2002 | Rodrigueza et al. | |
| 2002/0131995 A1 | 9/2002 | Szoka, Jr. | |
| 2002/0156062 A1 | 10/2002 | Boch et al. | |
| 2003/0147945 A1 | 8/2003 | Tardi et al. | |
| 2004/0037875 A1 | 2/2004 | Metselaar et al. | |
| 2004/0076691 A1 | 4/2004 | Haines et al. | |
| 2004/0097471 A1 | 5/2004 | Maring et al. | |
| 2004/0110695 A1 | 6/2004 | Dobbie | |
| 2005/0202078 A1 | 9/2005 | Schiffelers et al. | |
| 2006/0115523 A1 | 6/2006 | Konduri et al. | |
| 2006/0251711 A1 | 11/2006 | Konduri et al. | |
| 2011/0244029 A1 | 10/2011 | Barenholz et al. | |
| 2015/0071988 A1* | 3/2015 | Konduri | A61K 31/7032 424/94.64 |
| 2016/0228573 A1 | 8/2016 | Niyikiza et al. | |
| 2018/0169263 A1* | 6/2018 | Hanes | A61K 9/1271 |
| 2019/0046444 A1 | 2/2019 | Konduri et al. | |
| 2022/0331249 A1 | 10/2022 | Konduri et al. | |
| 2023/0029342 A1 | 1/2023 | Konduri et al. | |
| 2024/0180835 A1 | 6/2024 | Konduri et al. | |

FOREIGN PATENT DOCUMENTS

| | | |
|---|---|---|
| CN | 112300251 A | 2/2021 |
| EP | 2638896 A1 | 9/2013 |
| WO | WO-03040308 A2 | 5/2003 |
| WO | WO-03046145 A2 | 6/2003 |

(Continued)

OTHER PUBLICATIONS

Health Desk; Is there a cure for COVID-19? What is the cure? (Year: 2021).*
Barnes et al, J Allergy Clin Immunol, 2016, 138:16-27 (Year: 2016).*
Milne et al (https://doi.org/10.1101/2020.08.19.2017836) (Year: 2020).*
Mahase et al (BMJ, 2021, 373: n957; http://dx.doi.org/10.1136/bmj. n57) (Year: 2021).*
Beigel et al N Engl J Med, 383; 19, 2020 (Year: 2020).*
Yamaya et al , Respiratory Investigation, 58, 2020, 155-168 (Year: 2020).*
Almiñana, Núria, et al., "Biodistribution Study of Doxorubicin Encapsulated in Liposomes: Influence of Peptide Coating and Lipid Composition", Preparative Biochemistry and Biotechnology, vol. 34, No. 1, p. 77-96, 2004.

(Continued)

*Primary Examiner* — Celeste A Roney
(74) *Attorney, Agent, or Firm* — WILSON SONSINI GOODRICH & ROSATI

(57) ABSTRACT

In some aspects, provided herein are compositions of and methods for utilizing a sterically stabilized liposome carrier encapsulating a selected drug for the delivery of such drug effectual in the treatment of a mammal infected by a virus, such as SARS-COV-2, specifically in inhibiting the viral replication and reducing symptoms including lung inflammation. The compositions and methods disclosed herein provide a potential treatment for COVID-19 with improved patient compliance as they offer a less frequent dosing for the "long haulers" post COVID-19 initial infection.

28 Claims, 7 Drawing Sheets

(56) References Cited

FOREIGN PATENT DOCUMENTS

| | | |
|---|---|---|
| WO | WO-03105765 A2 | 12/2003 |
| WO | WO-2010045479 A1 | 4/2010 |
| WO | WO-2013066179 A1 | 5/2013 |
| WO | WO-2017048860 A1 | 3/2017 |
| WO | WO-2022235907 A1 | 11/2022 |

OTHER PUBLICATIONS

Berg, et al. Biochemistry. 5th Edition, W.H. Freeman, N.Y., 2002.
Bowtell, et al. DNA Microarrarys: A Molecular Cloning Manual. Cold Spring Harbor Laboratory Press, 2003.
Bulbake, Upendra, et al. Liposomal Formulations in Clinical Use: An updated Review. Pharmaceutics 9, 12, pp. 1-33 (2017).
European Search Report dated May 28, 2019 for EP Application No. 16847243.9.
Freshney, R Ian. Culture of Animal Cells: A Manual of Basic Technique and Specialized Applications, 6th Edition. John Wiley & Sons (2010).
Gangadharam, Pattisapu R. J. et al. Therapy of Mycobacterium avium Complex Infections In Beige Mice With Streptomycin Encapsulated In Sterically Stabilized Liposomes. Antimicrobial Agents And Chemotherapy 39(3):725-730 (1995).
Gaspar, M. M., et al. Rifabutin encapsulated in liposomes exhibits increased therapeuticactivity in a model of disseminated tuberculosis. International Journal of Antimicrobial Agents 31:37-45 (2008).
Gennaro, Alfonso R. et al. Remington's Pharmaceutical Sciences, 18th Edition. Mack Publishing Company (1990).
Hong MS, et al, pH-sensitive, serum-stable and long-circulating liposomes as a new drug delivery system, J Pharm Pharmacol.Jan. 2002;54(1):51-8. doi: 10.1211/0022357021771913. PMID: 11829129.
Hoover, John E. et al. Remington's Pharmaceutical Sciences, 15th Edition. Mack Publishing Company (1975).
Immordino, Maria Laura et al. "Stealth liposomes: review of the basic science, rationale, and clinical applications, existing and potential." International journal of nanomedicine vol. 1,3 (2006): 297-315.
International Search Report for Application No. PCT/US2016/051759 dated Nov. 30, 2016.
Kanae Ichikawa et al., "Suppression of immune response by antigen-modified liposomes encapsulating model agents: A novel strategy from the treatment of allergy", Journal of Controlled Release, vol. 167, p. 284-289, 2013.
Konduri, et al. Budesonide Delivered in Sterically Stabilized Liposomes Decreases Airway Hyperresponsiveness to Methacholine. Presented at the Annual AAAAI Meeting, Denver, CO., Mar. 2003. 19 pages.
Konduri, et al. Efficacy of Liposomal Budesonide in Experimental Asthma abstract presented at the Annual AAAAI meeting, New Orleans, LA, 2001. Published in Journal of Allergy Clinical Immunology, vol. 111, No. 2, 2003. 7 pages.
Konduri et al.: Prolung™-budesonide Inhibits SARS-CoV-2 Replication and Reduces Lung Inflammation. Archives of Pharmacology Therapeutics. 3(2):52-65 (2021).
Konduri, Kameswari Surya. et al. Efficacy of Liposome Encapsulated Budesonide in Experimental Asthma. Abstract 1029. Journal of Allergy Clinical Immunology 107(2): S315 (2001).
Kulig W. et al., "How well does cholesteryl hemisuccinate mimic cholesterol in saturated phospholipid bilayers?" J Mol Model. Feb. 2014;20(2):2121.
Lieberman, Herbert A, and Leon Lachman. Pharmaceutical Dosage Forms: Tablets. Marcel Decker (1980).
Milne et al.: Inhaled corticosteroids downregulate SARS-CoV-2-related gene expression in COPD: results from a RCT. medRxiv. 58(1):2100130 (2020).
Monali, Manohar, Potential of Anti-Ige in Food Allergy Therapy, Current Treatment Options i Allergy, vol. 1, No. 2, Mar. 2014, pp. 145-156.
Mount, David. Bioinformatics: Sequence and Genome Analysis. Cold Spring Harbor Laboratory Press, Second Edition (2001).
Noel K.Childers et al., "Adjuvant Activity of Monophosphoryl Lipid A for Nasal andOral Immunizationwith Soluble or Liposome-Associated Antigen", Infection and Immunity, Oct. 2000, vol. 68, No. 10, p. 5509-5516, 0019-9567/00304.00+0.
PCT/US2022/027838 International Search Report and Written Opinion dated Jul. 11, 2022.
Ramakrishnan et al.: Inhaled budesonide in the treatment of early COVID-19 (STOIC): a phase 2, open-label, randomized controlled trial. The Lancet Respiratory Medicine. 9(7):763-772 (2021).
Reed, Lowell Jacob, and Hugo Muench. A simple method of estimating fifty per cent endpoints. American Journal of Epidemiology 27(3):493-497 (1938).
Sambrook, et al. Condensed Protocols from Molecular Cloning: A Laboratory Manual. Cold Spring Harbor Laboratory Press, 2006.
Sambrook, Joseph, and Michael R Green. Molecular Cloning A Laboratory Manual, 4th edition. Cold Spring Harbor Laboratory Press (2012).
Schreier. Chapter 6.3: Pulmonary applications of liposomes. Medical Applications of Liposomes. D.D. Lasic and D. Papahadjopoulos. (pp. 474-475) (1998).
Thakur, A. K., et al. Patented therapeutic drug delivery strategies for targeting pulmonary diseases. Expert Opinion on Therapeutic Patents 1744-7674 (2020).
U.S. Appl. No. 12/218,777 Notice of Allowance dated May 16, 2014.
U.S. Appl. No. 12/218,777 Office Action dated Apr. 18, 2011.
U.S. Appl. No. 12/218,777 Office Action dated Aug. 23, 2011.
U.S. Appl. No. 12/218,777 Office Action dated Sep. 11, 2013.
U.S. Appl. No. 14/453,125 Office Action dated Feb. 8, 2017.
U.S. Appl. No. 14/453,125 Office Action dated Aug. 22, 2017.
U.S. Appl. No. 14/453,125 Office Action dated Apr. 5, 2018.
U.S. Appl. No. 15/759,651 Final Office Action dated Jun. 11, 2020.
U.S. Appl. No. 15/759,651 Non-Final Office Action dated Aug. 5, 2021.
U.S. Appl. No. 15/759,651 Non-Final Office Action dated Sep. 13, 2019.
U.S. Appl. No. 18/403,360 Notice of Allowance dated Nov. 27, 2024.
U.S. Appl. No. 18/403,360 Office Action dated May 13, 2024.
Wang, Xue-Qing, et al. pH-sensitive polymeric nanoparticles to improve oral bioavailability of peptide/protein drugs and poorly water-soluble drugs. European Journal of Pharmaceutics and Biopharmaceutics 82(2):219-229 (2012).
Weiner, et al. Genetic Variation: A Laboratory Manual. Cold Spring Harbor Laboratory Press, 2007.
Zhu, Guodong et al. "Secretory phospholipase $A_2$ responsive liposomes." Journal of pharmaceutical sciences vol. 100,8 (2011): 3146-3159. doi:10.1002/jps.22530.
Bates, Sandra R., et al. Phospholipids Co-isolated with Rat Surfactant Protein C Account for the Apparent Protein-Enhanced Uptake of Liposomes into Lung Granular Pneumocytes. Experimental Lung Research 15(5):695-708 (1989).
EP22799579.2 Extended European Search Report dated Feb. 12, 2025.

* cited by examiner

*Pro-BUD activity in Vero cells*

| Groups | *Pro-BUD* | Control-Protease inhibitor |
|---|---|---|
| EC 90 | 4.1 μg/mL | 8.1 g/mL |
| CC50 | >100 | >100 |
| SI 90 | >24* | >12 |

LIPOSOMAL FORMULATIONS FOR INHIBITING SARS-CoV-2 REPLICATION AND REDUCING LUNG INFLAMMATION

RELATED CASES

This application is entitled to and claims the benefit of the filing date of U.S. provisional application 63/184,580, filed May 5, 2021, and International Application No. PCT/US22/27838, filed May 5, 2022, each of which is incorporated by reference herein in its entirety.

FIELD OF THE INVENTION

This invention is directed to a sterically stabilized liposome carrier effective for the delivery of corticosteroids, such as budesonide and dexamethasone encapsulated in such liposome carrier effectual in the treatment of SARS-CoV-2 in a mammal, a composition comprising the sterically stabilized liposome carrier and corticosteroids encapsulated in a liposome carrier effective for inhibiting SARS-CoV-2 replication and reducing lung inflammation of a mammal which is administered via the respiratory tract of a mammal as an aerosol and a method of treatment using the composition. The composition allows less frequent dosing, administration in a safe and effective manner as an inhalation, with a low dose of steroid in a carrier targeted in the lung to the point of viral attachment of SARS-CoV-2, potentially making a significant impact in treating the COVID-19 Pandemic.

BACKGROUND OF THE INVENTION

Severe acute respiratory syndrome (SARS) was first reported in 2003, it is a respiratory illness caused by SARS-associated coronavirus (SARS-CoV), eventually leading to a global outbreak. In December 2019, a novel severe acute respiratory syndrome coronavirus (SARS-CoV-2) caused Corona Virus Disease 2019 (COVID-19), was first reported in Wuhan, China. SARS-CoV-2 was able to cross species barriers and infect humans and effectively transmitted from person to person via close contacts or respiratory droplets, eventually causing another global outbreak.

Individuals with COVID-19 have symptoms similar to influenza, ranging from mild coughing or fever to severe injuries or even failure in lungs and other organs. In some individuals, COVID-19 causes significant respiratory symptoms with pulmonary compromise due to severe inflammation, often requiring ventilatory support. This process can increase airway hyperresponsiveness and possibly lead to permanent lung damage. COVID-19 can also result in elevated IL-6 levels, antiphospholipid antibodies, D-dimer levels, renal failure, and increased clotting issues. COVID-19 might eventually cause death, especially in elderly populations or populations with other co-morbidities. By April 2022, there has been about 500 Million COVID-19 case reported and more than 6 Million of deaths reported worldwide. Over the past two years, the COVID-19 pandemic has significantly impacted public health, civil societies, and the global economy.

SARS-CoV-2 belongs to lineage B of the betacoronavirus genus of SARS-CoV and has a receptor binding domain (RBD) that is similar to the SARS-CoV RBD. Studies has demonstrated that ACE2 is a functional SARS-CoV receptor for viral entry into cells and that it is also critical in protecting lungs from injuries. SARS-CoV-2 spike protein binds to ACE2 with even higher binding affinity than that of SARS-CoV. In a healthy individual, ACE2 is expressed mainly in alveolar epithelial type II cells in the lung, but it is also expressed in other tissues such as heart, kidneys, blood vessels, and intestine. In the lung, the alveolar epithelial type II cells produce surfactant that reduces surface tension, which prevents alveoli from collapsing and ensures the lung's normal function of gas exchange. In COVID-19 patients, these cells are injured, which could explain the severe injuries in their lungs as well as the multi-organ dysfunction observed. The mechanism of COVID-19 has been shown to be secondary to SARS-CoV-2 virus binding to the ACE2 receptor on type II pneumocytes in the lung, which subsequently can result in overwhelming inflammation.

It has been shown that human recombinant soluble ACE2 reduces viral growth in vitro. High doses (e.g., 100 µg/mL) of a non-specific protease inhibitor, camostat mesylate, were also shown to reduce SARS-CoV-2 growth partially. Dexamethasone (DEX), a steroid, offers a significant benefit to decreasing inflammation with severe respiratory distress in COVID-19. Inhaled corticosteroids such as budesonide (BUD), are also showing a decrease in the respiratory symptoms with COVID-19. Inhaled steroids may decrease the ACE2 receptor, which may also be beneficial in decreasing the binding of SARS-CoV-2 virus.

While offering a significant benefit in decreasing inflammation, it is not known what effect steroids have on SARS-CoV-2 viral replication. Furthermore, inhaled corticosteroids have some major drawbacks, for one, these drugs must be given at least daily to be effective. For instance, the effective life of BUD alone in the lungs is just slightly more than one day, with a half-life of about 36 hours. This daily dosage requirement may lead to non-adherence by the patient. Since adherence to daily use of inhaled corticosteroids by the patient is critical in interrupting the chronic inflammation that occurs in "long haulers" who have lung symptoms for months post initial COVID-19 infection, this becomes a focal issue for effective therapy. Furthermore, the effective use of an inhaler is very technique-dependent. Typically, only up to about fifteen percent of a given dose is delivered to the lungs using an inhaler. The inhaled corticosteroids have a short half-life in the body and have potential toxicity when used in higher doses. These are serious disadvantages to the use of corticosteroid drugs in alleviating COVID-19 symptoms in lungs and inhibiting SARS-CoV-2 viral replication.

With the COVID-19 pandemic still gripping the world and its respiratory complications a leading cause of death, there is a vital need to develop or improve sustainable delivery systems for new and existing medications. In view of the likelihood of possible adverse effects with use of corticosteroids and the frequency with which the corticosteroids and other drugs are required to achieve therapeutic effects in individuals with COVID-19 or other SARS-COV virus, a continued effort has been directed to the development of improved techniques for administering a drug to a mammal via the respiratory tract of the mammal so that it may be administered more effectively and so that the effectiveness of the drug can be achieved using smaller doses and at less frequent dosing intervals.

SUMMARY

With the COVID-19 pandemic still gripping the world and its respiratory complications a leading cause of death, there is a vital need to develop or improve sustainable delivery systems for new and existing medications. In view of the likelihood of possible adverse effects with use of corticosteroids and the frequency with which the corticosteroids and other drugs are required to achieve therapeutic effects in individuals with COVID-19 or other SARS-COV virus, a continued effort has been directed to the development of improved techniques for administering a drug to a mammal via the respiratory tract of the mammal so that it may be administered more effectively and so that the effectiveness of the drug can be achieved using smaller doses and at less frequent dosing intervals.

In some embodiments, provided herein is a method of targeting delivery of an active agent to a point of viral attachment of a coronavirus, the method comprising: administering a pharmaceutical composition comprising an encapsulated active agent, the encapsulated active agent comprising an active agent and a liposome carrier comprising a surfactant-like lipid, wherein the encapsulated active agent targets alveolar Type II pneumocytes, thereby targeting delivery of the active agent to the point of viral attachment.

In some embodiments, the present disclosure provides a method for preventing or treating a coronavirus in a subject in need thereof, the method comprising: administering a pharmaceutical composition comprising a therapeutically effective amount of an active agent encapsulated in a liposome carrier comprising poly (ethylene glycol) distearoylphosphatidylethanolamine (PEG-DSPE), PEG-dipalmitoylphosphatidylethanolamine (DPPE), PEG-di-C:15 PE, PEG-soy PE, or PEG-egg PE, wherein the pharmaceutical composition is formulated for intranasal, intravenous, subcutaneous, aerosol, oral, or sublingual delivery, and wherein the active agent encapsulated in the liposome carrier is administered at a reduced frequency compared to an unencapsulated active agent, thereby preventing or treating infection by the coronavirus in the subject.

In some embodiments, provided herein is a method of inhibiting viral replication of a coronavirus, comprising: administering a pharmaceutical composition to a subject in need thereof, the pharmaceutical composition comprising a liposome carrier and a therapeutically effective amount of an active agent suitable for inhibiting viral replication of the coronavirus, wherein the administering to the subject is repeated at intervals that exceed 48 hours, thereby inhibiting viral replication of the coronavirus.

In some embodiments, provided herein is a method of reducing respiratory inflammation in a subject infected with a coronavirus, the method comprising: administering a pharmaceutical composition comprising: a therapeutically effective amount of an active agent suitable for inhibiting viral replication of the coronavirus, wherein the active agent is encapsulated in a liposome carrier, and wherein the active agent is released from the liposome carrier in a pH-resistant manner upon administration of the pharmaceutical composition, thereby reducing respiratory inflammation in the subject.

In some embodiments of any of the methods provided herein, the coronavirus comprises SARS-CoV-2 or a variant thereof.

In some embodiments of any of the methods provided herein, the active agent comprises chromolyn sodium, albuterol sulfate, terbutaline, albuterol, ipatropium, pirbuterol, epinephrine, salmeterol, levalbuterol, formoterol, leukotriene inhibitor, Secretory Leukocyte Peptidase Inhibitor (SLPI), antihistamines, anti-tuberculosis drugs, serine lung protease inhibitor, monophosphoryl lipid A, azelastine, theophylline, peptides for allergy immunology, amikacin, gentamicin, tobramicin, rifapentine, rifabutin, sparfloxacin, ciprofloxacin, quinolones, azithromycin, erythromycin, isoniazid, budesonide, flunisolide, triamcinolone, beclomethasone, fluticasone, mometasone, dexamethasone, hydrocortisone, methylprednisolone, prednisone, cortisone, betamethasone, or any combination or derivative thereof.

In some embodiments of any of the methods provided herein, the active agent comprises SLPI.

In some embodiments of any of the methods provided herein, the active agent comprises monophosphoryl lipid A.

In some embodiments of any of the methods provided herein, the active agent comprises a peptide. In some cases, the peptide comprises D-4F (apol lipoprotein A-1 mimetic).

In some embodiments provided herein, the administering the pharmaceutical composition inhibits viral attachment to alveolar Type II pneumocytes.

In some embodiments provided herein, the administering the pharmaceutical composition comprises administering via inhalation.

In some embodiments of any of the methods provided herein, the active agent comprises a corticosteroid. In some embodiments of any of the methods provided herein, the corticosteroid comprises a naturally-occurring corticosteroid. In some embodiments of any of the methods provided herein, the corticosteroid comprises a synthetic corticosteroid. In some embodiments of any of the methods provided herein, the corticosteroid comprises budesonide. In some embodiments of any of the methods provided herein, the corticosteroid comprises triamcinolone. In some embodiments of any of the methods provided herein, the corticosteroid comprises dexamethasone. In some embodiments of any of the methods provided herein, the corticosteroid comprises betamethasone. In some embodiments of any of the methods provided herein, the corticosteroid comprises beclomethasone. In some embodiments of any of the methods provided herein, the corticosteroid comprises prednisone. In some embodiments of any of the methods provided herein, the corticosteroid comprises prednisolone. In some embodiments of any of the methods provided herein, the corticosteroid comprises hydrocortisone or cortisone. In some embodiments of any of the methods provided herein, the corticosteroid comprises methylprednisolone.

The methods provided herein further include administering pharmaceutical compositions, wherein the pharmaceutical composition inhibits viral attachment to alveolar Type II pneumocytes. In some embodiments, the administering comprises administering via inhalation. In some cases, the administering comprises oral or sublingual delivery. In some cases, the administering comprises intravenous or subcutaneous delivery.

In some embodiments of any of the methods provided herein, the administering reduces levels of one or more of IL-6, IgE, eosinophils, or antiphospholipid antibodies relative to the levels prior to the administering. In some embodiments of any of the methods provided herein, the administering comprises decreasing Eosinophil Peroxidase (EPO) activity in the bronchoalveolar lavage fluid (BAL). In some embodiments of any of the methods provided herein, the administering comprises reducing airway hyperresponsiveness (AHR) to Methacholine (Mch).

In some embodiments of any of the methods provided herein, the administering comprises reducing lung inflammation.

In some embodiments of any of the methods provided herein, the pharmaceutical composition is substantially devoid of cholesterol. In some embodiments of any of the methods provided herein, the liposome carrier comprises phosphatidylglycerol (PG), phosphatidylcholine (PC), phosphatidylethanolamine (PE), phosphatidylserine (PS), phosphatidylinositol (PI), or any combination or derivative thereof.

In some embodiments of any of the methods provided herein, the liposome carrier comprises a sterically stabilized liposome carrier.

In some embodiments of any of the methods provided herein, the method further comprises administering an additional pharmaceutical composition comprising the active agent or a second agent. In some embodiments of any of the methods provided herein, the method further comprises administering to the subject a therapeutically effective amount of a second agent suitable for treating or preventing an infection of the coronavirus. In some embodiments of any of the methods provided herein, the method further comprises administering to the subject a therapeutically effective amount of a second agent suitable for inhibiting viral replication of the coronavirus. In some embodiments of any of the methods provided herein, the second agent is administered before, after, or concurrently with administration of the pharmaceutical composition comprising the at least one agent.

In some embodiments of any of the methods provided herein, the second agent is a monoclonal antibody, a protease inhibitor, an RNA-dependent RNA polymerase inhibitor, or any combination thereof.

In some embodiments of any of the methods provided herein, the monoclonal antibody comprises bamlanivimab, etesevimab, casirivimab, imdevimab, sotrovimab, or a combination thereof.

In some embodiments of any of the methods provided herein, the protease inhibitor comprises nirmatrelvir, ritonavir, or a combination thereof.

In some embodiments of any of the methods provided herein, the RNA-dependent RNA polymerase inhibitor, is an active metabolite of remdesivir.

In some embodiments of any of the methods provided herein, the liposome carrier has a gel-liquid crystalline phase transition temperature in a range from about −20° C. to about 44° C. Some embodiments provided include any of the methods provided herein, wherein the liposome carrier is stable at about pH 3 to about pH 7 or at about pH 7 to about pH 10. In some embodiments, the liposome carrier is unstable at about pH 3 to about pH 7 or at about pH 7 to about pH 10. In some embodiments of any of the methods provided herein, the liposome carrier comprises a membrane portion, and wherein at least about 50%, about 60%, about 70% or about 75% of the at least one agent is displaced within the membrane portion of the liposome carrier at the time of the administration. In some embodiments of any of the methods provided herein, the pharmaceutical composition contains about 1% to about 5% PEG-DSPE. In some embodiments of any of the methods provided herein, the pharmaceutical composition contains about 1% to about 33% of the at least one agent. In some embodiments of any of the methods provided herein, the pharmaceutical composition contains about 60% to about 99% phosphatidylglycerol, phosphatidylcholine, or a combination thereof.

In some embodiments of any of the methods provided herein, the liposome carrier comprises a pH-sensitive component. For example, in some embodiments, the pH-sensitive component comprises N-palmitoyl homocysteine (PHC).

In some embodiments of any of the methods provided herein, the administering is performed via inhalation.

In some embodiments of any of the methods provided herein, the pharmaceutical composition is administered at a selected time interval. In some embodiments of any of the methods provided herein, the selected time interval is a time up to once per two weeks. In some embodiments of any of the methods provided herein, the selected time interval is about once per week.

The present invention comprises a method for treating a mammal with a selected drug by forming an aerosol of a carrier consisting essentially of a sterically stabilized liposome carrier encapsulating the selected drug effective for treatment of the respiratory tract of a mammal. The sterically stabilized liposome carrier consists essentially of phosphatidylcholine and poly(ethylene glycol), the composition providing an effective life for the drug in the respiratory tract of a mammal equal to at least twice the effective life or up to a week of a single dose of the selected drug alone; and, allowing the mammal to inhale an effective amount of the aerosol at selected time intervals.

The invention also comprises a method for treating a mammal with a selected drug by forming an aerosol of a composition consisting of a sterically stabilized liposome carrier encapsulating an effective amount of a selected drug effective for treatment of the mammal. The sterically stabilized liposome carrier consists essentially of phosphatidylglycerol and poly (ethylene glycol), the composition providing an effective life for the drug in the respiratory tract of a mammal equal to at least twice the effective life, or up to a week, of a single does of the selected drug alone; and, allowing the mammal to inhale an effective amount of the aerosol at selected time intervals.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

Figure (FIG. 1 shows the testing results that compare the effect of PRO-BUD and a control-protease inhibitor on viral replication in SARS-CoV-2 infected Vero cells by the Virus Yield Reduction/Neutral Red Toxicity assay.

DETAILED DESCRIPTION

Definitions

Figure 2:
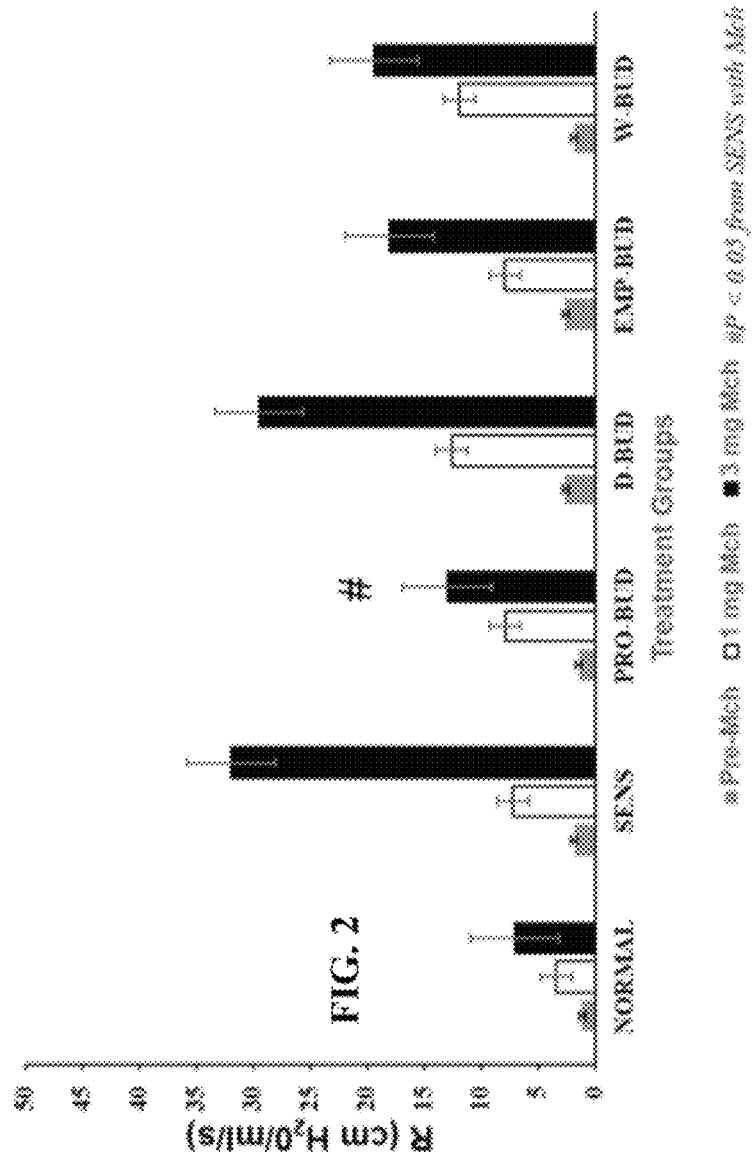
FIG. 2 illustrates the results of airway reactivity to methacholine (Mch) in all six treatment groups, which are defined in Table 2.

In the present disclosure, wherever aspects are described herein with the language "comprising," otherwise analogous aspects described in terms of "consisting of" and/or "consisting essentially of" are also provided. All definitions herein described whether specifically mentioned or not, should be construed to refer to definitions as used throughout the specification and attached claims.

Throughout the specification and attached claims, the singular form "a", "an" and "the" include plural references unless the context clearly dictates otherwise. For example, the term "a cell" includes a plurality of cells, including mixtures thereof.

In the present disclosure, one, some, or all of the properties of the various embodiments described herein may be applied to any aspect unless the content clearly dictates otherwise. Furthermore, that the various embodiments may be combined to form other embodiments of the present disclosure. These and other aspects of the disclosure will become apparent to one of skill in the art. These and other embodiments of the disclosure are further described by the detailed description herein.

Throughout the specification and attached claims, and unless defined otherwise, all technical and scientific terms used herein have the same meaning as commonly understood by one of ordinary skill in the art to which this disclosure is related. For example, the Concise Dictionary of Biomedicine and Molecular Biology, Juo, Pei-Show, 2nd ed., 2002, CRC Press; The Dictionary of Cell and Molecular Biology, 3rd ed., 1999, Academic Press; and the Oxford Dictionary Of Biochemistry And Molecular Biology, Revised, 2000, Oxford University Press, provide one of ordinary skill with a general dictionary of many of the terms used in this disclosure.

Amino acids may be referred to herein by either their commonly known three letter symbols or by the one-letter symbols recommended by the IUPAC-IUB Biochemical Nomenclature Commission. Nucleotides, likewise, may be referred to by their commonly accepted single-letter codes.

The term "about" or "approximately" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 20%, up to 10%, up to 5%, or up to 1% of a given value. Alternatively, particularly with respect to biological systems or processes, the term can mean within an order of magnitude, preferably within 5-fold, and more preferably within 2-fold, of a value. Where particular values are described in the application and claims, unless otherwise stated the term "about" meaning within an acceptable error range for the particular value should be assumed.

The term "administering" may comprise administering via an oral, intravenous, subcutaneous, The terms "disease", "disorder", or "condition" are used interchangeably herein, refer to any alternation in state of the body or of some of the organs, interrupting or disturbing the performance of the functions and/or causing symptoms such as discomfort, dysfunction, distress, or even death to the person afflicted or those in contact with a person. A disease or disorder can also be related to a distemper, ailing, ailment, malady, disorder, sickness, illness, complaint, or affectation.

The term "in need thereof" when used in the context of a therapeutic or prophylactic treatment, means having a disease, being diagnosed with a disease, or being in need of preventing a disease, e.g., for one at risk of developing the disease. Thus, a subject in need thereof can be a subject in need of treating or preventing a disease.

As used herein, the term "administering," refers to the placement of a compound or composition into a subject by a method or route that results in at least partial delivery of the agent at a desired site. Pharmaceutical compositions disclosed herein can be administered by any appropriate route which results in an effective treatment in the subject, including but not limited to oral, intranasal, subcutaneous, intravenous delivery. Where necessary or desired, administration can include, for example, intracerebroventricular ("icy") administration, intranasal administration, intracranial administration, intracelial administration, intracerebellar administration, or intrathecal administration.

The terms "pH sensitive," "pH sensitivity," or "in a pH sensitive manner" are used herein to refer to the stability of a liposome carrier at a certain pH range or the ability of a liposome carrier to release its content at a specific pH range.

The terms "pH resistant," "pH independent," "pH resistance," "pH independence," "in a pH resistant manner," or "in a pH independent manner" are used herein to refer to the stability of a liposome carrier or the ability of a liposome carrier to retain its contents despite the pH of the surrounding environment.

The terms "polypeptide", "oligopeptide", "peptide" and "protein" are used interchangeably herein to refer to polymers of amino acids of any length. The polymer may be linear or branched, it may comprise modified amino acids, and it may be interrupted by non-amino acids. The terms also encompass an amino acid polymer that has been modified naturally or by intervention; for example, disulfide bond formation, glycosylation, lipidation, acetylation, phosphorylation, or any other manipulation or modification, such as conjugation with a labeling component. Also included within the definition are, for example, polypeptides containing one or more analogs of an amino acid (including, for example, unnatural amino acids, etc.), as well as other modifications known in the art. It is understood that, because the polypeptides as described herein are based upon an antibody, the polypeptides can occur as single chains or associated chains.

An "individual" or a "subject" is a mammal, more preferably a human. Mammals also include, but are not limited to, farm animals, sport animals, pets, primates, horses, dogs, cats, mice and rats.

The term "effective amount" or "therapeutically effective amount" refers to the amount of an agent that is sufficient to effect beneficial or desired results. The therapeutically effective amount may vary depending upon one or more of: the subject and disease condition being treated, the weight and age of the subject, the severity of the disease condition, the manner of administration and the like, which can readily be determined by one of ordinary skill in the art. The term "effective amount" also applies to a dose that will provide an image for detection by an appropriate imaging method. The specific dose may vary depending on one or more of: the particular agent chosen, the dosing regimen to be followed, whether it is administered in combination with other compounds, timing of administration, the tissue to be imaged, and the physical delivery system in which it is carried. An effective amount of an active agent may be administered in a single dose or in multiple doses.

As used herein, "pharmaceutically acceptable carrier" or "pharmaceutical acceptable excipient" includes any material which, when combined with an active ingredient, allows the ingredient to retain biological activity and is non-reactive with the subject's immune system. Examples include, but are not limited to, any of the standard pharmaceutical carriers such as a phosphate buffered saline solution, water, emulsions such as oil/water emulsion, and various types of wetting agents. Preferred diluents for aerosol or parenteral administration are phosphate buffered saline or normal (0.9%) saline. Compositions comprising such carriers are formulated by well-known conventional methods (see, for example, Remington's Pharmaceutical Sciences, 18th edition, A. Gennaro, ed., Mack Publishing Co., Easton, PA, 1990; and Remington, The Science and Practice of Pharmacy 20th Ed. Mack Publishing, 2000).

Throughout the specification and attached claims, the methods and systems of this disclosure as described herein may employ, unless otherwise indicated, conventional techniques and descriptions of molecular biology (including recombinant techniques), cell biology, biochemistry, microarray and sequencing technology, which are within the skill of those who practice in the art. Such conventional techniques include polymer array synthesis, hybridization and ligation of oligonucleotides, sequencing of oligonucleotides, and detection of hybridization using a label. Specific illustrations of suitable techniques can be had by reference to the examples herein. However, equivalent conventional procedures can, of course, also be used. Such conventional techniques and descriptions can be found in standard laboratory manuals such as Green, et al., Eds., *Genome Analysis: A Laboratory Manual Series* (Vols. I-IV) (1999); Weiner, et al., Eds., *Genetic Variation: A Laboratory Manual* (2007); Dieffenbach, Dveksler, Eds., *PCR Primer: A Laboratory Manual* (2003); Bowtell and Sambrook, *DNA Microarrays: A Molecular Cloning Manual* (2003); Mount, *Bioinformatics: Sequence and Genome Analysis* (2004); Sambrook and Russell, *Condensed Protocols from Molecular Cloning: A Laboratory Manual* (2006); and Sambrook and Green, Molecular Cloning: A Laboratory Manual, 4th Edition (2012) (all from Cold Spring Harbor Laboratory Press); Stryer, L., *Biochemistry* (4th Ed.) W.H. Freeman, N.Y. (1995); Gait, "*Oligonucleotide Synthesis: A Practical Approach*" IRL Press, London (1984); Nelson and Cox, *Lehninger, Principles of Biochemistry*, 6$^{th}$ Ed., W.H. Freeman Pub., New York (2012); R. I. Freshney, *Culture of Animal Cells: A Manual of Basic Technique and Specialized Applications*, 6$^{th}$ Ed., Wiley-Blackwell (2010); and Berg et al., *Biochemistry*, 5$^{th}$ Ed., W.H. Freeman Pub., New York (2002), all of which are herein incorporated by reference in their entirety for all purposes. Before the present compositions, research tools and systems and methods are described, it is to be understood that this disclosure is not limited to the specific systems and methods, compositions, targets and uses described, as such may, of course, vary. It is also to be understood that the terminology used herein is for the purpose of describing particular aspects only and is not intended to limit the scope of the present disclosure, which will be limited only by appended claims.

The present disclosure relates to findings that budesonide (BUD) encapsulated in sterically stabilized liposomes (PRO-BUD) significantly inhibited viral replication in SARS-CoV-2 infected cells and localized into type II pneumocytes, decreased lung inflammation, Airway Hyperresponsiveness (AHR) and Eosinophil Peroxidase (EPO) activity with Methacholine (Mch) challenge. This drug formulation may offer a potential inhalational treatment for COVID-19. Test results are summarized demonstrating an improvement, at least in administering BUD to COVID-19 patients with a lower dose in a sustained manner. The abstract does not disclose a suitable sterically stabilized liposome, suitable types of sterically stabilized liposomes or any method for producing a suitable sterically stabilized liposome, for producing PRO-BUD or other suitable corticosteroid drugs encapsulated in a suitable sterically stabilized liposome, or a method for administering the sterically stabilized liposome containing BUD or other suitable corticosteroid drugs such as Dexamethasone (DEX) in patients with COVID-19 or other SARS-COV viruses.

Liposomes

Liposomes in General

Liposomes are well known materials that comprise primarily phospholipid bilayered vesicles of many types that can encapsulate a variety of drugs and some types are avidly phagocytosed by macrophages in the body. The various interactions of the liposomes can be generalized into four categories: (1) exchange of materials, including lipids, lipids and proteins with cell membranes or transfer of encapsulated drugs to the cell; (2) absorption or binding of liposomes to cells; (3) cell internalization of liposomes by endocytosis or phagocytosis once bound to the cell; and, (4) fusion of bound liposomes with the cell membrane. In all these interactions, there is a strong dependence on lipid composition, type of cell, presence of specific receptors and many other parameters.

Liposomes have been used to provide drugs in mammals, particularly when it is desired to apply the drugs to specific areas for specific applications. Liposomes have been used to encapsulate antibiotics, antiviral agents and the like and have been shown to enable enhanced efficacy against a variety of infectious diseases. A major drawback of conventional liposomes is that they have a relatively short life in a mammal body. Most applications have used liposomes in the bloodstream.

To extend the life of liposomes in a mammal body, attempts have been made to develop sterically stabilized liposomes, which have a longer life in a mammal body. Attempts to extend the life of liposomes have included the use of poly(ethylene glycol), natural glycolipids, surfactants, polyvinyl alcohol, polylactic acid, polyglycolic acid, polyvinyl pyrrolidene, polyacrylamine and other materials in various combinations with the liposomes in attempts to provide sterically stabilized liposomes, which are effective for drug delivery and which are compatible with a mammal circulatory system. The most prominent sterically stabilized liposomes utilize distearoylphosphatidylcholine as the primary phospholipid.

Liposome-encapsulated antibiotics show increased efficacy for treatment of a variety of infectious diseases. Liposomes have also been considered for the delivery of aerosolized asthma medications, such as chromolyn sodium and albuterol sulfate. However, the potential role of liposome encapsulation in enhancing the efficacy of inhaled steroid preparations used in reducing SARS-COV-2 viral replication COVID-19 remained unknown at the time this invention was made.

Liposomes are characterized by their lipid composition, surface charge, steric interactions and number of lamellae. Conventional liposomes are composed of naturally-occurring phospholipids, such as phosphatidylglycerol and phosphatidylcholine mixed with or without cholesterol. Although conventional liposomes can encapsulate a variety of drugs, they are recognized in vivo by the cells of the reticuloendothelial system and are cleared rapidly from the circulation. In addition, incorporation of triamcinolone (TRI) or beclomethasone into conventional liposomes results in their rapid redistribution and leakage from liposomes into the medium.

In contrast to conventional liposomes, sterically stabilized liposomes exhibit increased stability in plasma and decreased uptake by the reticuloendothelial system.

For use in the present invention, it has been necessary to produce sterically stabilized liposomes which are compatible with a mammal respiratory system and lungs, adapted for aerosol administration to the mammal and which have an extended life in the lungs, respiratory tract and bloodstream. Thus, conventional liposomes are not functional for the purpose of treating the respiratory tract of a mammal for the applications discussed in this application.

Carriers Uniquely Adapted for Use in the Lungs

A property of the carriers of the present invention is that the carriers are uniquely adapted for use in the lungs. They have the ability to not disrupt the composition and function of lung surfactant which provides a lateral surface pressure in the lungs which prevents lung collapse. Thus an ideal mixture of lipids in the sterically stabilized liposomes will be one closest to that of lung surfactant lipids. One such lipid composition is DPPC:DPPG:PEG-DSPE (80:15:5). An alternative lipid composition is DPPC:DPPG:PEG-DSPE (78:18:4). DPPC is an abbreviation for dipalmitoylphosphatidylcholine. DPPG is an abbreviation for dipalmitoylphosphatidylglycol. PEG is an abbreviation for poly(ethylene glycol). DPPE is an abbreviation for distearoylphosphatidylethanolamine. The ratios are expressed as molar ratios.

Properties of the carrier of the present invention uniquely adapted to retain the drug for long periods of time are: (1) its composition which facilitates the encapsulation of a drug within the bilayer or inside the carrier; (2) the presence of sufficient amounts of PEGylated (PEG refers to poly(ethylene glycol)) lipids to stabilize and protect the liposome from disruption upon exposure to biological milieu, including lung surfactant and lung surfactant proteins and upon nebulization; and, (3) the presence of an amount of PEGylated lipid sufficient to enable the drug to remain liposomeassociated for a long enough period to be effective in the lungs.

The sterically stabilized liposomes of the carriers have a composition such that they are readily administered to the mammal as an aerosol and will remain stable in the presence of serum and in the extra-cellular environment. They preferentially localize to the lungs, especially to areas of inflammation as commonly seen in asthma, i.e., in lung inflammation and in the airway hypersensitivity response. A suitable way to administer the composition of the present invention is via an aerosolization, such as nebulizer. These sterically stabilized liposomes are amenable to nebulization. The combination of these sterically stabilized liposomes with encapsulated drugs useful in the treatment of mammalian respiratory tract diseases has been shown herein with corticosteroids such as BUD; monophosphoryllipid A (MPL); peptides: D-4F (apol lipoprotein A-1 mimetic) and Serine Lung Protease Inhibitor (SLPI) for the treatment of lung inflammation and airway hyper-responsiveness.

These liposome carriers are effective for the delivery of a wide variety of drugs for the treatment of respiratory and other diseases, including COVID-19. The stability of the sterically stabilized liposomes in combination with the encapsulated drug is more pronounced than currently available drug therapies. As demonstrated in the following examples, this stability may allow a drug, such as a corticosteroid, to be administered only once every one to two weeks. The dosage used in these treatments is typically the same or similar to that used on a daily basis. The drug may thus be administered at two, three, four, five, six or seven days or longer intervals. In some instances, the effective life may be up to two weeks or longer. The effective life of the drug in the respiratory tract has thus been extended to the longer of at least twice the life of the drug alone, or at least one week, thus reducing the amount of the drug required to one-seventh of the previously required dosage. The term "effective life" as used herein means a period during which the drug effect is continued. Sustained action of the drug has been obtained at comparable initial dosages with a reduction in toxicity using the carrier. No suggestion or any enabling disclosure or data in the prior art is known that extended drug life could be obtained with these liposome carriers for aerosol drug treatments for asthma or any other disease, particularly for lung inflammation and airway hyper-responsiveness, such as COVID-19-related respiratory symptoms. The extended drug life has not been obtained with the administration of the free drug and free carrier given simultaneously but without encapsulation.

The drugs can be of a wide variety, such as D-4F, which is a known antiinflammatory cardiovascular drug for cardiovascular diseases whose efficacy with the carrier of the present invention has been shown in the Examples for use in a mammalian respiratory tract. The drug in combination with the sterically stabilized liposomes has been shown to enter the alveoli from which oxygen is passed to the blood. It is considered that the drug encapsulated in the carrier is also passed through the tight junction from the alveoli into the blood stream as is the oxygen. The sterically stabilized liposomes are relatively stable in the blood stream and provide extended drug life for the encapsulated drug.

The sterically sterilized liposome carriers of the present invention, which are adapted for combination with a variety of drugs for use in the aerosol treatment of a respiratory tract in a mammal, comprise sterically stabilized liposomes that are compatible with the respiratory tract of a mammal and which are effective to extend the effective life of the drug in the respiratory tract by a time equal to the longer of at least twice the effective life of the drug alone, or at least one week. The liposome carriers of the present invention are tailored to be compatible with naturally occurring fluids and surfactant found in the lung and the liposome carriers have been observed to bind to Type 2 pneumocytes in the lungs. The carrier is tailored to accommodate the surfactant found in the lungs so that the compositions of the liposome carriers of the present invention are similar to lung surfactant and provide long stability to the alveoli and the respiratory tract when used to encapsulate drugs and have been found to be effective to extend the effective life of the drugs administered.

Pegylated delivery systems are now being used to deliver a variety of immune based therapies and mRNA vaccines, such as Moderna® and Pfizer® and have been implicated in allergic reactions. In some embodiments, Polyethylene glycol (PEG) 2000 is used in the composition for PRO-BUD, specifically, in the liposome carrier that used to encapsulate BUD. In some embodiments, PRO-BUD with PEG2000 in its liposome carrier shows significant decrease in markers of allergic inflammation such as serum IgE levels, reduction of eosinophils in the lung lavage fluid and peripheral blood, and EPO activity studies in an allergic model, using a repeat allergen challenge. In some embodiments, PRO-BUD with PEG2000 in its liposome carrier shows no severe allergic reactions during dose escalation in animal studies. In some cases, PEG 2000 also has an immunomodulatory function. In some cases, small amount of PEG in the liposome carrier system for PRO-BUD acts as an additional barrier to prevent viral attachment of SARS-CoV-2 virus.

Figure 7:
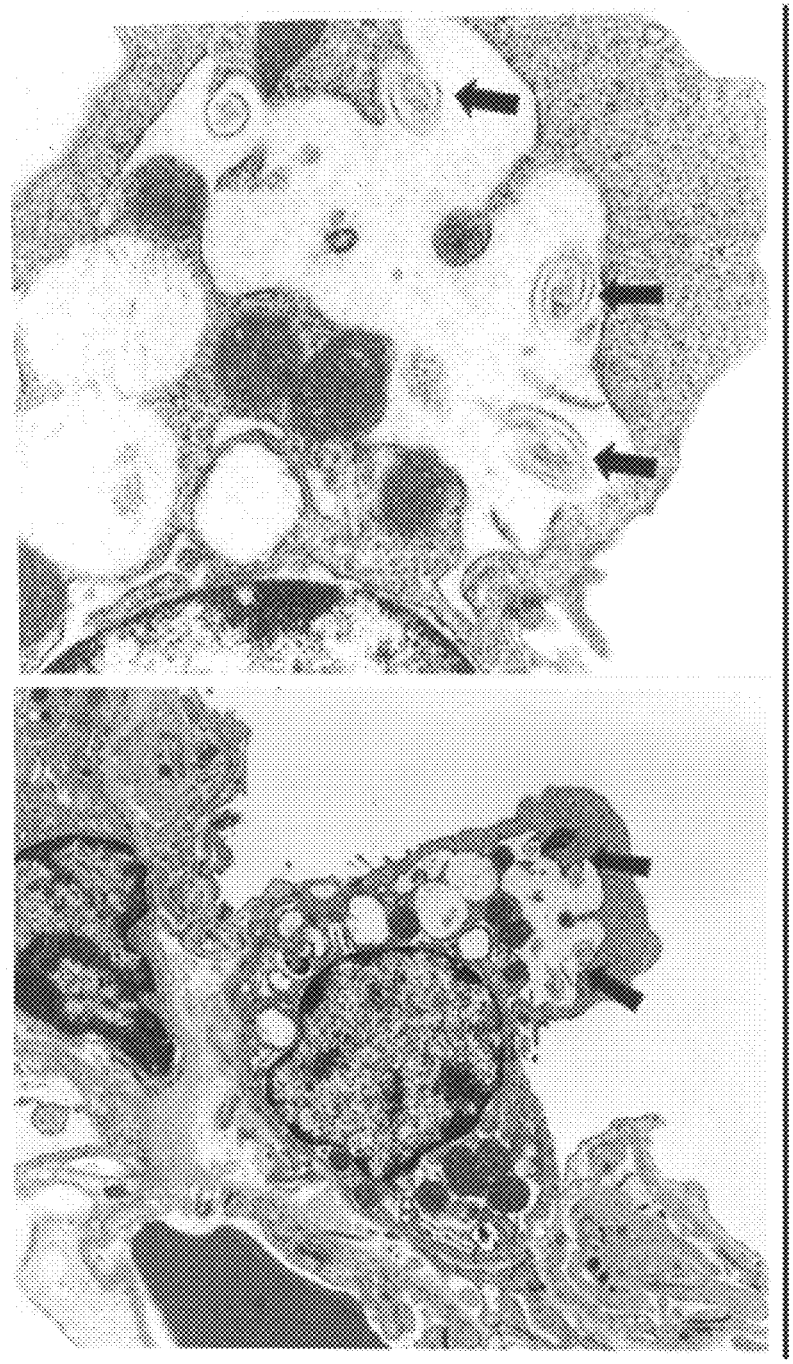
FIG. 7 shows graphical and pictorial presentations of Pro-BUD localizing to Type II pneumocytes.

The carriers have wide applicability for use in the respiratory tract of a mammal. The carrier that encapsulates BUD is not destroyed in the lungs rapidly and is deposited in the cells around the alveoli in the lung tissues (FIG. 7). The carrier particles bearing BUD pass through the lung airways down to the alveoli and the alveolar tight junctions. Since the carrier encapsulating the drug is deposited in the lung tissues, the encapsulated drug has the same medicinal effect as usual but since it is encapsulated in the carrier deposited in the lung tissues, it is released more slowly, thus providing a long-term effect. Any drug which can be encapsulated in the carrier is considered to provide the same long-term effect in the respiratory tract or in the bloodstream. In the examples it is shown that this effect has been achieved with corticosteroids, BUD, for the treatment of lung inflammation and airway hyper-responsiveness. All of these drugs when encapsulated and tested in a mammal as shown have given the extended conventional effective treatment life. Further conventional liposomes, by comparison to sterically stabilized liposomes, do not provide an extended drug life. Secondarily, the drug rapidly leaks out from the conventional liposomes.

The liposome carriers of the present invention comprise phosphatidylcholine or phosphatidylglycerol and poly (ethylene glycol) or both phosphatidylcholine and phosphatidylglycerol with poly (ethylene glycol). The phosphatidylcholine and phosphatidylglycerol may be synthetically derived (e.g., synthetic palmitoyloleoyl-PG (POPC) or synthetic palmitoyloleoyl-PG (POPG)) or they may be derived from chicken eggs or soybeans. If derived from eggs they contain acyl groups having varying numbers of carbon atoms, dependent upon the variety and diet of the chicken that produces the eggs. The phosphatidylcholine is typically present in a relatively significant quantity in the combination of sterically stabilized liposomes.

A further component of the liposome carriers is poly (ethylene glycol), in the molecular range from about 500 to above 5,000 daltons. The poly(ethylene glycol) may be present in combination with phosphatidylcholine, phosphatidylglycerol and lipids which may include amino or other groups.

Any of the head groups (phosphatidylcholine and phosphatidylglycerol) or the poly(ethylene glycol), may be attached to acyl groups containing from about 8 to about 18 carbon atoms. Preferably, from about 14 to about 18 carbon atoms are present in the acyl groups. Such groups comprise distearoyl, stearoyl oleoyl, stearoyl palmitoyl, dipalmitoyl, dioleoyl, palmitoyl oleoyl and dipalmitoleoyl.

If shorter chains are used, such as palmitoyl, dimyristoyl, didodecanoyl, didecanoyl or dioctanoyl, the poly(ethylene glycol)-lipid is likely to exchange into biological milieu. This may in some instances permit the sterically stabilized liposome carrier to better partition onto lung surfactant after sustained shedding or sustained exchanging its poly(ethylene glycol) moiety.

Desirably, the liposome carriers may be tailored to the particular mammalian lung system contemplated. It is considered, however, that such liposome carriers will fall within the criteria defined above and hereinafter for the liposomes.

The sterically stabilized liposomes may contain at least one or both of phosphatidylcholine and phosphatidylglycerol, and poly (ethylene glycol) distearoylphosphatidyldiethanolamine, lipid conjugated polyoxyethylene, lipid conjugated polysorbate, or lipids conjugated to other hydrophilic steric coating molecules safe for in vivo use.

A particularly preferred carrier is phosphatidylcholine, phosphatidylglycerol, poly (ethylene glycol) distearoylphosphatidyldiethanolamine (PEGDSPE).

The molecular weight of the phosphatidylcholine is desirably from about 509 g/mol to about 791 g/mol, preferably from about 677 g/mol to about 791 g/mol and more preferably from about 734 g/mol to about 791 g/mol. The molecular weight of the phosphatidylglycerol is desirably from about 520 g/mol to about 802 g/mol, preferably from about 688 g/mol to about 802 g/mol and more preferably from about 744 g/mol to about 802 g/mol. The molecular weight of the poly(ethylene glycol) moiety is desirably from about 851 g/mol to about 5802 g/mol, preferably from about 1019 g/mol to about 3775 g/mol and more preferably from about 2749 g/mol to about 2806 g/mol. The control of the molecular weight of the phosphatidylcholine and the phosphatidylglycerol is a significant feature of the applicant's presently-disclosed liposomal formulations. Some suitable carrier composition ranges are shown below in Table 1.

TABLE 1

Ranges for some suitable carrier composition.

Carrier 1

| PC (mole %) | PG (mole %) | *PEG-PE (mole %) |
|---|---|---|
| 0-99.4 | 0-99.4 | 0.5-10 |
| Preferred 60-70 | 10-40 | 1-5 |
| Most Preferred 70-80 | 20-30 | 2-5 |

Carrier 2

| PC (mole %) | PG (mole %) | PEG-PE (mole %) | Cholesterol (mole %) |
|---|---|---|---|
| 0-99.4 | 0-99.4 | 0.5-10 | 0.5-33 |
| Preferred 60-90 | 10-40 | 1-5 | 0.5-20 |
| Most Preferred 70-80 | 20-30 | 2-5 | 0.5-10 |

Composition 1

| PC (mole %) | PG (mole %) | PEG-PE (mole %) | Drug (mole %) |
|---|---|---|---|
| 0-98.5 | 0-98.5 | 0.5-10 | 0.5-33 |
| Preferred 60-90 | 10-40 | 1-5 | 1-33 |
| Most Preferred 70-80 | 20-30 | 2-5 | 1-33 |

Composition 2

| PC (mole %) | PG (mole %) | PEG-PE (mole %) | Cholesterol (mole %) | Drug (mole %) |
|---|---|---|---|---|
| 0.1-99.4 | 0.1-99.4 | 0.5-10 | 1-33 | 1-33 |
| Preferred 60-90 | 10-40 | 1-5 | 0.1-20 | 1-33 |
| Most Preferred 70-80 | 20-30 | 2-5 | 0.1-10 | 1-33 |

*The molecular weight of PEG is limited to 350 g/mol.

Many of the commonly used sterically stabilized liposomes used for intravenous treatments are not suitable for use in the lungs. For instance, distearoylphospatidylcholine, which has a high gel-liquid crystalline phase transition temperature of about 54° C., is a commonly used primary phospholipid in sterically stabilized liposomes for intravenous treatment.

The gel-liquid crystalline phase transition temperature of the mixed phospholipids in the sterically stabilized liposome carrier should be in the range from about −20° C. to about 44° C. and preferably from about −10 to about 42° C. It is expected that for liposome carriers containing cholesterol, the transition range will be broadened compared to that of liposome carriers containing phospholipids alone. The inclusion of cholesterol will enable a lipid composition with a relatively high transition temperature (e.g., in the gel phase at 37° C.) to have a substantial portion of the membrane in the fluid or liquid crystalline phase at body temperature. This is an important feature of Applicants' invention. The drugs, which can be encapsulated with the sterically stabilized liposome carrier of the present invention, comprise substantially any drug that is useful to treat diseases via the respiratory tract of a mammal. It is anticipated that most drugs that are useful in such treatments will be compatible with the sterically stabilized liposomes. Typically, the carriers and the encapsulated drugs are administered via an aerosol to the respiratory tract.

Both the phosphatidylcholine and the phosphatidylglycerol meeting the criteria set forth in this application can be used alone with poly (ethylene glycol) as the carrier either without or with cholesterol in amounts from about 0.1 to about 33 mole percent. The same drugs are effective (PC and PG with PEG or PC or PG with PEG and with or without cholesterol) in the ranges in Table 1 as long as the criteria in this application are met to insure compatibility with the mammal respiratory tract.

Types of drugs that can be included in the liposome carriers are not limited so long as the formation and stability of an encapsulation in the sterically stabilized liposome carrier is not adversely affected.

The combined liposome carriers and drugs are prepared to have unilamellar or multilamellar vesicles of sizes up to about 0.05 to about 5 microns. Preferably the composition is prepared to have substantially homogeneous sizes in a selected size range, with the average diameter typically being up to about 0.02 to about 2.5 micrometers. One method for obtaining the desired size is extrusion of the composition through polycarbonate membranes having pores of a selected size, such as up to about 0.05 to about 5 micrometers.

Some drugs that are effective for treatment of the respiratory tract of a mammal, and are considered particularly suitable are inhaled corticosteroids; such as, budesonide, flunisolide, triamcinolone, beclomethasone, fluticasone, mometasone, dexamethasone, hydrocortisone, methylprednisolone, prednisone, cortisone, betamethasone, or the like. Some other suitable drugs are bronchodilators; such as terbutaline, albuterol, ipatropium, pirbuterol, epinephrine, salmeterol, levalbuterol, formoterol, or the like. Chromolyn sodium and albuterol sulfate are also suitable drugs.

Other drugs that are also considered to be effective and suitably administered using the liposome carriers of the present invention include, but are not limited to, leukotriene inhibitors; such as montelukast, zafirlukast, zileuton, or the like, as well as antihistamines; such as loratadine, cetirizine or the like. Anti-Tuberculosis drugs for MTB or atypical mycobacteria; such as, isoniazid, ethambutol, pyrazinamide, rifamycin; rifampin, streptomycin, clarithromycin, or the like, are also considered to be suitable. Other drugs; such as the serine lung protease inhibitor (SLPI), azelastine, and theophylline; and other peptides, such as those that relate to Allergy Immunotherapy for indoor and outdoor allergens, or the like, may also be considered suitable. Additionally, amikacin, gentamicin, tobramicin, rifabutin, rifapentine, sparfloxacin, ciprofloxacin, quinolones, azithromycin, erythromycin, or the like, are considered to be suitable. Monophosphoryllipid A (MPL) is a suitable drug.

Most previously disclosed attempts using liposomes have been with conventional liposomes and only a select few with sterically stabilized liposomes have been used in attempts to extend the effective life of select drugs used in the bloodstream of mammals. These liposomes must exist in a radically different environment than in the respiratory tract of a mammal. Particularly in the lungs, certain surfactant requirements exist for materials which are compatible with the fluids in the lungs and the like as discussed above. Further the conventional liposome carriers delivered to the lungs are susceptible to attack by phagocytic cells as are conventional liposomes used to position drugs in the bloodstream, which are eventually cleared mostly by liver and spleen macrophages. Further most uses of liposomes encapsulating drugs in the bloodstream are administered via intravenous injections. While it is not clear what mechanisms exist that permit sterically stabilized liposomes to exist for longer periods of time in certain portions of the body than would be anticipated for liposomes that were not sterically stabilized, it is clear that the liposome carriers of the present invention are remarkably stable in the respiratory tract environment and are effective to greatly extend the effective life of encapsulated drugs used to treat various diseases of the respiratory tract.

The preparation of the liposome carriers, the encapsulation and use of corticosteroid drugs, a peptide (D-4F), a protease inhibitor (SLPI) and monophosphoryl lipid A (MPL) in the carrier, and treatments of mice according to the present invention, are demonstrated in the following examples to show the broad applicability of the carrier.

Controlled Release of Agents from Liposomes by Tuning pH-Stability

The release of the one or more agents from the sterically stabilized liposome carrier can be controlled by tuning pH-stability to adjust to various body compartments with different pH profiles. Therefore, the sterically stabilized liposome carrier can be stable in one pH range and not in another. For example, the sterically stabilized liposome carrier can be selected to be stable in the stomach but not in the small intestine, or vice versa, thereby. For example, the sterically stabilized liposome carrier can be tuned to be stable above about pH 3, 4, 5, 6, 7, 8, 9, and 10; or below about pH 10, 9, 8, 7, 6, 5, 4, or 3. In some cases, two populations of liposome carriers can be used: a first population of sterically stabilized liposome carrier is stable in acid and passes through the stomach with contents inside, but which is not stable in the small intestine, where its liposomal contents are released; a second population is not stable in the stomach and releases its contents there. In this manner, the pharmaceutical composition described herein can be used to control the release of multiple agents in different body compartments. In some cases, the pharmaceutical composition and/or the sterically stabilized liposome carrier can comprise cholesteryl hemisuccinate. In some cases, the pharmaceutical composition and/or the sterically stabilized liposome carrier can be substantially devoid of cholesteryl hemisuccinate.

A pH sensitive component of the pharmaceutical composition and/or the sterically stabilized liposome carrier can comprise a phospholipid, an acylated amino acid, a fatty acid, a cholesterol or cholesterol derivative, a double chain amphiphile, or any combination thereof. For example, the pH sensitive component can be N-palmitoyl homocysteine (PHC).

The pharmaceutical composition and/or the sterically stabilized liposome carrier can be stable or can release its content at about pH 1 to about pH 14. For example, the pharmaceutical composition and/or the sterically stabilized liposome carrier can be stable at about pH 1 to about pH 2, about pH 1 to about pH 3, about pH 1 to about pH 4, about pH 1 to about pH 5, about pH 1 to about pH 6, about pH 1 to about pH 7, about pH 1 to about pH 8, about pH 1 to about pH 9, about pH 1 to about pH 10, about pH 1 to about pH 11, about pH 1 to about pH 12, about pH 1 to about pH 13, about pH 1 to about pH 14, about pH 2 to about pH 3, about pH 2 to about pH 4, about pH 2 to about pH 5, about pH 2 to about pH 6, about pH 2 to about pH 7, about pH 2 to about pH 8, about pH 2 to about pH 9, about pH 2 to about pH 10, about pH 2 to about pH 11, about pH 2 to about pH 12, about pH 2 to about pH 13, about pH 2 to about pH 14, about pH 3 to about pH 4, about pH 3 to about pH 5, about pH 3 to about pH 6, about pH 3 to about pH 7, about pH 3 to about pH 8, about pH 3 to about pH 9, about pH 3 to about pH 10, about pH 3 to about pH 11, about pH 3 to about pH 12, about pH 3 to about pH 13, about pH 3 to about pH 14, about pH 4 to about pH 5, about pH 4 to about pH 6, about pH 4 to about pH 7, about pH 4 to about pH 8, about pH 4 to about pH 9, about pH 4 to about pH 10, about pH 4 to about pH 11, about pH 4 to about pH 12, about pH 4 to about pH 13, about pH 4 to about pH 14, about pH 5 to about pH 6, about pH 5 to about pH 7, about pH 5 to about pH 8, about pH 5 to about pH 9, about pH 5 to about pH 10, about pH 5 to about pH 11, about pH 5 to about pH 12, about pH 5 to about pH 13, about pH 5 to about pH 14, about pH 6 to about pH 7, about pH 6 to about pH 8, about pH 6 to about pH 9, about pH 6 to about pH 10, about pH 6 to about pH 11, about pH 6 to about pH 12, about pH 6 to about pH 13, about pH 6 to about pH 14, about pH 7 to about pH 8, about pH 7 to about pH 9, about pH 7 to about pH 10, about pH 7 to about pH 11, about pH 7 to about pH 12, about pH 7 to about pH 13, about pH 7 to about pH 14, about pH 8 to about pH 9, about pH 8 to about pH 10, about pH 8 to about pH 11, about pH 8 to about pH 12, about pH 8 to about pH 13, about pH 8 to about pH 14, about pH 9 to about pH 10, about pH 9 to about pH 11, about pH 9 to about pH 12, about pH 9 to about pH 13, about pH 9 to about pH 14, about pH 10 to about pH 11, about pH 10 to about pH 12, about pH 10 to about pH 13, about pH 10 to about pH 14, about pH 11 to about pH 12, about pH 11 to about pH 13, about pH 11 to about pH 14, about pH 12 to about pH 13, about pH 12 to about pH 14, or about pH 13 to about pH 14. In some cases, the at least one agent can be released from the liposome carrier in a pH sensitive manner, for example, the at least one agent can be released from the liposome carrier in one of the above pH ranges. In some cases, the at least one agent can be released from the liposome carrier in a pH independent manner.

The pharmaceutical composition and/or the sterically stabilized liposome carrier can remain stable in the presence of serum and/or in the extra-cellular environment. In some cases, the stability of the sterically stabilized liposome carrier in combination with the encapsulated therapeutic agent is more pronounced than currently available drug therapies. In some cases, the stability of the sterically stabilized liposome carrier can allow a therapeutic agent, such as a corticosteroid, to be administered only once every one to two weeks. The dosage used in these treatments is typically the same or similar to that used on a daily basis. The therapeutic agent may thus be administered at two, three, four, five, six or seven days or longer intervals. In some instances, the effective life may be up to two weeks or longer. The term "effective life" as used herein means a period during which the therapeutic agent effect is continued.

Multiple Populations of Liposomes

In some embodiments, more than one population of liposome (e.g., differing in one or more characteristics, such as agents contained, phospholipid composition, presence absence of anti-IgE antibody, cholesterol, or steroid) are administered to a subject in need thereof Method of Treatment and Inhibition of Viral Replication Disclosed herein are methods of treating a contagious and potentially fatal respiratory illness caused by a coronavirus, such as SARS-COV-2, methods of inhibiting the replication of a virus, such as a coronavirus, and methods of reducing lung inflammation associated with such virus. In some cases, a SARS-COV virus, such as SARS-COV-2 that causes COVID-19, results in significant respiratory symptoms. In some embodiments, the significant respiratory symptoms include pulmonary compromise due to severe inflammation, which often requiring ventilatory support. In some cases, the significant respiratory symptoms comprise increased airway hyperresponsiveness. In some cases, the significant respiratory symptoms lead to permanent lung damage. COVID-19 results in, for example, elevated IL-6 levels, antiphospholipid antibodies, D-dimer levels, renal failure, and increased clotting issues. In some cases, COVID-19 causes significant respiratory symptoms with prolonged lung inflammation. In some cases, pulmonary inflammation leads to lung damage and an increase in airway hyperreactivity (AHR), which can subsequently result in the respiratory symptoms and compromise. In some cases, COVID-19 causes production of autoimmune antibodies, such as antiphospholipid antibodies, which may be directed at lung surfactant lipids. In some cases, PRO-BUD, secondary to its surfactant like composition, is crucial in treating COVID-19 respiratory symptoms as well post COVID-19 syndrome, such as the "long haulers" who have lung symptoms for months post the initial infection.

In some embodiments, a method for treating a coronavirus disease comprises administering to a subject in need thereof, a pharmaceutical composition comprising a therapeutically effective amount of at least one agent suitable for treating the coronavirus disease, wherein the at least one agent is encapsulated in a liposome carrier. In some embodiments, the at least one agent is released from the liposome carrier in a pH sensitive manner upon administration of the pharmaceutical composition, thereby treating the coronavirus disease. In some embodiments, the at least one agent is released from the liposome carrier in a pH resistant manner upon administration of the pharmaceutical composition, thereby treating the coronavirus disease. In some embodiments, the at least one agent is released from the liposome carrier in a pH sensitive manner and a pH resistant manner upon administration of the pharmaceutical composition, thereby treating the coronavirus disease. In some embodiments, the coronavirus disease is COVID-19.

In some embodiments, a method for inhibiting viral replication of a virus comprises administering to a subject in need thereof, a pharmaceutical composition comprising a therapeutically effective amount of at least one agent suitable for inhibiting viral replication of the coronavirus, wherein the at least one agent is encapsulated in a liposome carrier. In some embodiments, the at least one agent is released from the liposome carrier in a pH sensitive manner upon administration of the pharmaceutical composition, thereby inhibiting viral replication of the virus. In some embodiments, the at least one agent is released from the liposome carrier in a pH resistant manner upon administration of the pharmaceutical composition, thereby inhibiting viral replication of the virus. In some embodiments, the at least one agent is released from the liposome carrier in a pH sensitive manner and in a pH resistant manner upon administration of the pharmaceutical composition, thereby inhibiting viral replication of the virus.

In some embodiments, the virus is a coronavirus, such as SARS-CoV-2 or a variant thereof. In some embodiments, a variant of SARS-CoV-2 is D614G, ETA, IOTA, BETA, INDIAN "DOUBLE MUTANT," EPSILON, ALPHA, GAMMA, DELTA, OMICRON, or any combination thereof.

In some embodiments, the method for treating a coronavirus disease further comprises administering to the subject a therapeutically effective amount of a second agent suitable for treating or preventing the coronavirus disease. In some embodiments, the method for inhibiting the viral replication of a coronavirus further comprises administering to the subject a therapeutically effective amount of a second agent suitable for inhibiting viral replication of the coronavirus. In some embodiments, the second agent is administered before, after, or concurrently with administration of the pharmaceutical composition comprising the at least one agent. In some embodiments, the second agent is a monoclonal antibody, a protease inhibitor, an RNA-dependent RNA polymerase inhibitor, or any combination thereof. In some embodiments, the monoclonal antibody comprises bamlanivimab, etesevimab, casirivimab, imdevimab, sotrovimab, or a combination thereof. In some embodiments, the protease inhibitor comprises nirmatrelvir, ritonavir, or a combination thereof. In some embodiments, the RNA-dependent RNA polymerase inhibitor, is an active metabolite of remdesivir.

In some embodiments, the at least one agent is a corticosteroid drug, chromolyn sodium, albuterol sulfate, terbutaline, albuterol, ipatropium, pirbuterol, epinephrine, salmeterol, levalbuterol, formoterol, leukotriene inhibitor, antihistamines, anti-tuberculosis drugs, serine lung protease inhibitor, monophosphoryl lipid A, azelastine, theophylline, peptides for allergy immunology, amikacin, gentamicin, tobramicin, rifapentine, rifabutin, sparfloxacin, ciprofloxacin, quinolones, azithromycin, erythromycin, isoniazid or, budesonide, flunisolide, triamcinolone, beclomethasone, fluticasone, mometasone, dexamethasone, hydrocortisone, methylprednisolone, prednisone, cortisone, betamethasone, or any combination or derivative thereof. In some embodiments, at least one agent is budesonide or a derivative thereof. In some embodiments, at least one agent is dexamethasone or a derivative thereof.

Methods—Virus Yield Reduction (VYR) Assay

A Virus Yield Reduction (VYR) assay was performed to determine test compound inhibition of virus replication. Confluent or near-confluent cell culture monolayers of Vero 76 cells were prepared in 96-well microplates. PRO-BUD was tested at eight half-$\log_{10}$ concentrations (0.032, 0.1, 0.32, 1, 3.2, 10, 32 and 100 µg/ml) for antiviral activity and cytotoxicity. Plates were incubated at 37° C. with 5% $CO_2$ until >80% CPE (virus-induced cytopathic effect) was observed in virus control wells. Five microwells were used per dilution: three for infected cultures and two for uninfected toxicity cultures. Controls for the experiment consisted of six microwells that were infected and not treated (virus controls) and six that were untreated and uninfected (cell controls) on every plate. A known active drug was tested (protease inhibitor) in parallel as a positive control drug. Cells were scored for the presence or absence of virus after distinct CPE was observed, and the $CCID_{50}$ (50% cell culture infectious dose) is calculated using the Reed-Muench method as described in Reed, L. J., and H. Muench. "A Simple Method of Estimating Fifty Percent Endpoints. Am J Hyg 27 (1938): 493-98. In addition, virus yielded in the presence of PRO-BUD was titrated and compared to virus titers from the untreated virus controls. Titration of the viral samples was performed by endpoint dilution.

After maximum virus-induced cytopathic effect (CPE) was observed, the viable plates were stained with 0.011% neutral red dye at 37° C. The neutral red medium was removed, and the cells rinsed once with phosphate buffered saline (PBS) to remove residual dye. The incorporated dye content was extracted and quantified by evaluation of absorbance on a spectrophotometer at 540 nm. The dye content in each set of wells was converted to a percentage of dye present in untreated control wells and normalized based on the virus control. The 90% (one $\log_{10}$) effective concentration ($EC_{90}$) was calculated by regression analysis by plotting the $\log_{10}$ of the inhibitor concentration versus $\log_{10}$ of virus produced at each concentration. The 50% effective ($EC_{50}$, virus-inhibitory) concentrations and 50% cytotoxic ($CC_{50}$, cell-inhibitory) concentrations were then calculated by regression analysis. The quotient of $CC_{50}$ divided by $EC_{50}$ gives the selectivity index (SI) value, with compounds having a SI value >10 being considered active.

Methods—Animals

Six-week-old male C57 black 6 mice (C57BL/6) were purchased from Charles River Laboratories, Inc., Wilmington, MA The animals were provided with an ovalbumin-free diet and water ad libitum and were housed in an environment-controlled, pathogen-free animal facility. All animal protocols were approved by the Animal Care Committee of the Medical College of Wisconsin and the Zablocki Veterans Administration Medical Center, in agreement with the National Institute of Health's guidelines for the care and use of laboratory animals. The studies were unable to be conducted in animal models with COVID-19 as current animal models generally had only mild forms of the disease and were not seen as adequate models for assessment of anti-inflammatory properties of inhalation drugs at the time the studies were conducted.

Methods—Ovalbumin Sensitization

The animals, e.g., C57BL/6 mice, were sensitized with ovalbumin (OVA). On day 0, each mouse was anesthetized with methoxyflurane given by inhalation. A fragmented heat coagulated OVA implant was inserted subcutaneously on the dorsal aspect of the cervical region.

For a ten-day period (days 14-24), each mouse was given a 30-minute aerosolization of a 6% OVA solution on alternate days. This method of sensitization led to significant elevations in eosinophil peroxidase (EPO), peripheral blood (PB) eosinophils, and serum lgE levels, along with lung inflammation as seen on histopathology by day 24. This method also increased airway hyperresponsiveness (AHR) to methacholine (Mch) challenge, by day 24. All treatment groups were compared with either Sensitized, Untreated or Normal, Unsensitized, Untreated mice.

The 20 µg dose of BUD was noted to decrease EPO in the BAL, and inflammation on histopathological examination of the lung tissues, along with other inflammatory parameters studied, without evidence of toxicity to the spleen, liver, bone marrow, skin or the gastrointestinal tract. Based on these results, 20 µg of BUD was encapsulated in liposome carrier for administration one dose, once a week of as an inhalation.

Methods—Treatment Groups

Treatment groups after the OVA sensitization was completed (day 25), Sensitized animals received nebulized treatments for four weeks as illustrated in Table 2: (a) (PRO-BUD)-received 20 μg of PRO-BUD administered once a week; (b) (D-BUD)-20 μg of budesonide (without liposome carrier) administered daily (c) (EMP-PRO)-received empty liposome carrier (buffer-loaded), administered once a week; (d) (W-BUD)-20 μg of BUD (without liposome carrier) administered once a week. All treatment groups were compared to either Sensitized Untreated (SENS) or Untreated, Unsensitized (NORMAL) mice.

TABLE 2

Study Groups

| GROUP | Treatment Type | Liposome Carrier | Budesonide 20 μg | Frequency |
|---|---|---|---|---|
| PRO-BUD | Weekly treatment with BUD-encapsulated in liposome carrier | + | + | Once per week |
| EMP-PRO | Buffer-Loaded Empty liposome carrier | + | − | Once per week |
| D-BUD | Daily treatment with budesonide only | − | + | Daily |
| W-BUD | Weekly treatment with budesonide only | − | + | Once per week |
| SENS | Sensitized Untreated with inflammation | − | − | None |
| NORMAL | Normal, Unsensitized Untreated | − | − | None |

Methods—Drugs and Reagents

BUD for daily therapy was diluted from premixed vials (0.25 mg/ml) commercially available from Astra Pharmaceuticals (Wayne, PA), and administered via a Salter Aire Plus Compressor (Salter Labs, Irvine, CA). Budesonide for encapsulation, N-2 hydroxyethylpiperzine-N'-2-ethanesulfonic acid (HEPES), ovalbumin, methacholine, PBS, sodium citrate, 0-phenylenediamine, 4N H2SO4 and horseradish peroxidase were purchased from Sigma-Aldrich, St. Louis, MO Phosphatidylcholine (PC), phosphatidylglycerol (PG), and poly (ethylene glycol)-distearoylphosphatidylethanolamine (PEG-DSPE) were obtained from Avanti Polar Lipids, Alabaster, AL Methods—Liposome Preparation Budesonide (BUD) was encapsulated into either sterically stabilized phosphatidylglycerol[PG]:phosphatidylcholine [PC]:cholesterol:poly(ethylene glycerol)[PEG] distearoylphosphatidylethanolamine [DSPE]-[PG:PC:Cholesterol:PEG-DSPE] (2:8:5:0.5) in the sterically stabilized liposomes or conventional (phosphatidylglycerol-phosphatidylcholine-cholesterol) (2:8:5) as a carrier through use of a modified protocol derived from the protocol described by Gangadharam, et al., Antimicrob Agents Chemother, 1995:39:725-730. A portion of the cholesterol used in control liposomes was replaced by BUD dissolved in chloroform-methanol (2:1) during the preparation of the lipid mixture. The resulting composition was PG:PC:Cholesterol:PEG-DSPE:BUD (2:8:3:0.5:2).

Lipids were dried onto the sides of a round-bottomed glass flask or glass tube by rotary evaporation. The dried film was then hydrated by adding sterile 140 mmol/L NaCl and 10 mmol/L HEPES (pH 7.4) and vortexing. The resulting multilamellar liposomes were extruded 11 times through two stacked polycarbonate membranes of 0.8 μm pore diameter (Whatman-Nuclepore, Sigma-Aldrich) using a custom-built high-pressure extrusion device or a syringe extruder (Avanti Polar Lipids). Empty liposome carrier was prepared similar to PRO-BUD, without budesonide, and was diluted with HEPES-buffered saline to maintain an equal volume for dosing.

Methods—Histopathology Observations

Histopathological examinations performed with and without Methacholine challenge are as follows:

The lungs were removed and fixed with 10% phosphate buffered formalin. Tissue samples were taken from the trachea, bronchi, large and small bronchioles, interstitium, alveoli, and pulmonary blood vessels. The tissues were embedded in paraffin, sectioned at 5 μm thickness and stained with hematoxylin and eosin and analyzed using light microscopy at 100× magnification.

Table 3 shows a detailed description of Quantitative Histopathology Scoring System used to evaluate the extent of lung inflammation. Coded slides were examined by a veterinary pathologist in a blinded fashion for evidence of inflammatory changes, according to Table 3. Each of the parameters evaluated was given an individual number score. Objective measurements of histopathological changes included the number of eosinophils and other inflammatory cells, surrounding the bronchi, aggregation around blood vessels, presence of desquamation and hyperplasia of the airway epithelium, mucus formation in the lumen of the airways and infiltration of inflammatory cells surrounding the alveoli.

TABLE 3

| TRACHEA | BRONCHI | LARGE BRONCHIOLES | SMALL BRONCHIOLES | ALVEOLAR INTERSTITIUM | Alveoli |
|---|---|---|---|---|---|
| Epithelium Hyperplasia(mm) | Epitheliuma Hyperplasia(mm) | Epithelium Hyperplasia(mm) | Epithelium Hyperplasia(mm) | Thickening(mm) Edema(mm) Cells(#)-PMNs(#), Eosinophils(#) | Thickening(mm) Edema(mm) Cells(#)-PMNs(#), Eosinophils(#) Multinucleated-Gian Cells(#) |

TABLE 3-continued

| TRACHEA | BRONCHI | LARGE BRONCHIOLES | SMALL BRONCHIOLES | ALVEOLAR INTERSTITIUM | Alveoli |
|---|---|---|---|---|---|
| Desquamation | Desquamation | Desquamation | Desquamation | | |
| Submucosa | Submucosa | Submucosa | Submucosa | Microgranulomas | |
| Edema(mm) | Edema(mm) | Edema(mm) | Edema(mm) | Cells(=)-PMNs(#), | |
| Cells(#)-PMINs(#), | Cells(#)-PMNs(#), | Cells(#)-PMNs(#) | Cells(#)-PMNs(#) | Eosinophils(#) | |
| Eosmophils(#) | Eosmophils(#) | Eosinophils(#) | Bosinophils(#) | Multinucleated-Giant Cells(#) | |
| Granulomas | Granulomas | Granulomas | Granulomas | Microgranulomas | |
| Blood Vessels | Blood Vessels | Blood Vessels | Blood Vessels | Blood Vessels | Blood Vessels |
| Perivascular edema | Perivascular edema | Perivascular edema | Perivascular edema | Perivascular edema | Perivascular edema |
| Perivascular cuffing | Perivascular cuffing | Perivascular cuffing | Perivascular cuffing | Perivascular cuffing | Perivascular cuffing |
| Cells(#)-PMNS(#), | Cells(#)-PMNS(#), | Cells(#)-PMNS(#), | Cells(#)-PMNS(#), | Cells(#)-PMNS(#), | Cells(#)-PMNS(#), |
| Eosinophils(#) | Eosinophils(#) | Eosinophils(#) | Eosinophils(#) | Eosinophils(#) | Eosinophils(#) |

Each of the parameters evaluated were given an individual number score. The cumulative score was obtained using the individual scores and designated as no inflammation (score:0), mild inflammation (score:1-2), moderate inflammation (score:3-4), and severe inflammation (score: 5-6). (mm=millimeter).

Methods—Airway Hyperresponsiveness (AHR) to Methacholine (Mch) Methods

The effectiveness of the Drug and Carrier combination on airway reactivity or airway hyperresponsiveness (AHR) to Methacholine challenge (Mch) was evaluated by assessing.

Pulmonary Mechanics. These experiments are designed to demonstrate that the sensitivity of the airway that causes excessive coughing or reactivity (AHR) and the like in COVID-19 patients with lung injuries are effectively treated by the use of our Drug/Carrier combination comprising of sterically stabilized liposomes.

Pulmonary Mechanics were evaluated as follows:

Animals were sensitized using ovalbumin sensitization as described above under the Animals section.

AHR to Mcb Challenge

Pulmonary resistance measurements were made after four weeks of therapy. As an antigen challenge and to demonstrate sensitization, an aerosolized dose of 6% ovalbumin was given to each animal 24 hours before the evaluation of the pulmonary mechanics.

The animals were anesthetized with an intraperitoneal injection of a solution of ketamine and xylazine (40 mg/kg body weight for each drug). A 20 mg/kg body weight maintenance dose of pentobarbital sodium was given before placement in the body plethysmogragh. The doses were titrated to maintain a steady level of anesthesia without causing significant respiratory depression.

A tracheotomy was performed and a tracheotomy tube was placed in each animal. A saline-filled polyethylene tube with side holes was placed in the esophagus and was connected to a pressure transducer for measurement of pleural pressure. The mice were then placed in a body plethysmograph chamber for measurements of flow, volume, and pressure.

The tracheostomy tube was connected to a tube through the wall of the plethysmograph allowing the animal to breathe room air spontaneously. The esophageal catheter was connected to a pressure transducer. Proper placement of the esophageal catheter was verified using assessments of pressure-volume-flow loops. A screen pneumotachometer and a Valadyne differential pressure transducer were used to measure flow in and out of the plethysmograph.

The frequency response of the plethysmograph-pneumotachometer system determined using the volume oscillator of an Electromechanical Multifunction Pressure Generator available from Millar Instruments, Inc., Houston, TX, was such that the amplitude decreased by less than 10% to a frequency of 12 Hz. The maximum breathing frequency in the mice studied was 4.3 Hz.

Signals from the pressure transducer and the pneumotachometer were processed using a Grass polygraph (Model 7) recorder. The flow signal was integrated using a Grass polygraph integrator (Model 7P10) to measure corresponding changes in pulmonary volume. Pressure, flow and volume signal outputs were digitized and stored on computer using an analog-to-digital data acquisition system (CODAS—available from Dataq Instruments, Inc., Akron, OH). The pressure and volume signals were also displayed to verify catheter placement and monitor the animal during the experiment.

The digitalized data were analyzed for dynamic pulmonary compliance, pulmonary resistance, tidal volume, respiratory frequency and minute ventilation from about six to ten consecutive breaths at each recording event. Compliance and resistance were calculated from pleural pressure, airflow, and volume data.

To correct for the resistance of the tracheal cannula, the pressure-flow curve relationship for the cannula alone was measured. It was found to have resistance of 0.3 $cmH2O \cdot s \cdot ml^{-1}s$, which was then subtracted from the total resistance, measured with the animal in place to determine the pulmonary resistance. Mch challenge was performed after baseline measurements were obtained. Mch (Sigma Chemicals, St. Louis, MO) was injected intraperitoneally at three-minute intervals in successive cumulative doses of 30, 100, 300, 1,000 and 3,000 μg.

Methods—Eosinophil Peroxidase (EPO) Activity in Bronchoalveolar Lavage (BAL) Fluid EPO activity was measured in the BAL. In some experimental groups EPO activity was obtained with and without Mch challenge. At the time of sacrifice, the trachea was exposed and cannulated with a ball-tipped 24-gauge needle. The lungs were lavaged three times with 1 ml PBS.

All washings were pooled and the samples were frozen at −70° C. The samples were later thawed and assayed to determine EPO activity. EPO in the BAL was assessed as follows. A substrate solution consisting of 0.1 mol/L sodium citrate, O-phenylenediamine, and $H_2O_2$ (3%), pH 4.5 was mixed with BAL supernatants at a ratio of 1:1. The reaction mixture was incubated at 37° C. and the reaction was stopped by the addition of 4N $H_2SO_4$. Horseradish peroxidase was used as a standard EPO activity (in international units per milliliter) and was measured by spectrophotometric analysis at 490 nm.

Methods—Electron Microscopy Studies

Lung specimens were processed using standard protocols and were evaluated under transmission electron microscopy to evaluate using a Hitachi 600 electron microscope. Data was evaluated to determine the stability and deposition of the PRO-BUD in the lung. Specimens were processed for two-week study, after one dose of PRO-BUD was administered via inhalation.

Methods—Data Analysis

One-way ANOVA with Tukey-Kramer multiple comparison data analysis was used for Mch responses using SigmaStat Statistical Software (SPSS Science). EPO activity analysis was performed using the Student t test. Over the Study period, there were no significant increases or decreases in inflammation within each group according to weekly measurements for all of the inflammatory parameters being evaluated. Therefore all the weekly measurements are presented as Cumulative data and are presented as mean+/− standard error of the mean (SEM). A $p<0.05$ was considered to be statistically significant for all of the above statistical comparisons.

Inhibition of Viral Replication

Without wishing to be bound by a certain theory, the mechanism of COVID-19 is secondary to SARS-CoV-2 virus binding to the ACE2 receptor on type II pneumocytes in the lung and/or the gastrointestinal (GI) mucosa, which subsequently results in overwhelming inflammation. In some cases, inhaled steroids, such as dexamethasone and BUD, decrease the ACE2 receptor, which can be beneficial in decreasing the binding of SARS-CoV-2 virus. Furthermore, dexamethasone and BUD offer significant benefits to decreasing inflammation with severe respiratory distress in COVID-19.

Without wishing to be bound by a certain theory, PRO-BUD localizes in type II pneumocytes, the site of SARS-CoV-2 binding. Type II pneumocytes produce and secrete pulmonary surfactant lipids and proteins, and other soluble components of the innate immune system. Type II pneumocytes are considered to be the regulatory cells of the lung, and plays a critical role in lung inflammation, with immune interactions with alveolar macrophages. In diseases such as tuberculosis (TB), Type II pneumocytes likely signal alveolar macrophages to retain the TB organism subsequently leading to lung inflammation. Lung macrophages can also play an important role in the lung inflammation and damage in COVID-19 and acute respiratory distress syndrome (ARDS). a corticosteroid encapsulated in a liposome carrier described herein, such as PRO-BUD has a potential to interrupt the interaction of Type II and alveolar macrophages, and the subsequent progression to the lung inflammation noted in COVID-19. In addition, it may aid in lung stabilization and maintaining alveolar function, secondary it's sustained steroid effect with a composition similar to lung surfactant. The unique lipid composition of a corticosteroid encapsulated in a liposome carrier described herein can play a role in the innate immune system and can potentially decrease IL-6 levels, which can be markedly elevated in COVID-19. With these unique properties, the liposome carrier system for BUD, DEX and other corticosteroids potentially has a significant impact in treating the COVID-19 Pandemic and future SARS pandemic.

The method of treating coronavirus-related respiratory symptoms and inhibiting SARS-COV viral replication relates to the administration of a composition of a corticosteroid such as BUD or DEX encapsulated in a liposome carrier (PRO-BUD or PRO-DEX, respectively), as provided herein. In some cases, PRO-BUD or PRO-DEX uses a vehicle similar to lung surfactant, allowing for inhalational administration of a low dose of BUD OR DEX, in a sustained manner. In some embodiments, weekly inhalation of PRO-BUD OR PRO-DEX significantly reduces lung inflammation associated with SARS-CoV viruses. In some embodiments, the unique lipid composition of PRO-BUD or PRO-DEX has immunomodulating effects. In some embodiments, the unique lipid composition of PRO-BUD or PRO-DEX stabilizes the endothelium. In some embodiments, the unique lipid composition of PRO-BUD or PRO-DEX decreases IL-6 levels. In some embodiments, the unique lipid composition of PRO-BUD or PRO-DEX decreases antiphospholipid antibodies. In some embodiments, PRO-BUD or PRO-DEX is delivered to the alveolar junction, targets Type II pneumocytes, and decreases SARS-CoV-2 viral replication. In some cases, encapsulating antibiotics in the liposome carrier of PRO-BUD or PRO-DEX can target macrophages of reticuloendothelial system. In some embodiments, the reticuloendothelial system is from a COVID-19 patient. In some cases, the liposome carrier of PRO-BUD or PRO-DEX preferentially targets areas with increased inflammation and macrophages in systemic circulation. In some embodiments, the systemic circulation is in a COVID-19 patient.

In some embodiments, the PRO-BUD or PRO-DEX inhibits the viral replication of a coronavirus, such as SARS-COV-2. In some embodiments, the coronavirus is a variant of SARS-COV-2. In some embodiments, the coronavirus is SARS-COV or a variant thereof. Exemplary variants of SARS-COV strains or mutations that are subject to the treatment of PRO-BUD or PRO-DEX are listed in Table 4.

TABLE 4

Variant Pseudoviral particles expressing coronavirus spike protein subject to PRO-BUD Treatment.

| VARIANT PSEUDOVIRAL PARTICLE | PRODUCT (INTEGRAL MOLECULAR) | STRAIN/VARIANT NAME (INTEGRAL MOLECULAR) | WHO | STRAIN/MUTATIONS |
|---|---|---|---|---|
| SARS-COV-1 | RVP-801L | SARS-COV-1 URBANI | — | — |
| SARS-COV-2 ("WT") | RVP-701L | WUHAN-HU-1 | — | REFERENCE SEQ (GENBANK QHD43416.1) |
| D614G | RVP-702L | D614G B.1, 20A | — | D614G |
| ETA (NIGERIAN) | RVP-723L | NIGERIAN/EUROPEAN VARIANT B.1.525, 20A/439K | ETA | Q52R, ΔH69/V70, ΔY144, E484K, D614G, Q677H, F888L |

TABLE 4-continued

Variant Pseudoviral particles expressing coronavirus spike protein subject to PRO-BUD Treatment.

| VARIANT PSEUDOVIRAL PARTICLE | PRODUCT (INTEGRAL MOLECULAR) | STRAIN/VARIANT NAME (INTEGRAL MOLECULAR) | WHO | STRAIN/MUTATIONS |
|---|---|---|---|---|
| IOTA (NEW YORK) | RVP-726L | NEW YORK VARIANT B.1.536, 20C/484K | IOTA | L5F, T95I, D253G, E484L, D614G, A701V |
| BETA (SOUTH AFRICAN) | RVP-724L | SOUTH AFRICAN VARIANT Δ3 B.1.351, 20H/501Y.V2 | BETA | L18F, D80A, D215G, ΔL242/A243/L244, R246I, K417N, N501Y, E484K, D614G, A701V |
| INDIAN "DOUBLE MUTANT" | RVP-727L | INDIAN VARIANT B.1.617, RBD MUTATIONS ONLY ("DOUBLE MUTANT") | — | L452R, E484Q, D614G |
| EPSILON (CALIFORNIA) | RVP-713L | CALIFORNIA VARIANT B.1.427/B.1.429, 20C/452R | EPSILON | S13I, W 152C, L452R, D614G |
| ALPHA (U.K.) | RVP-706L | UK VARIANT B.1.1.7, 20I/501Y.V1 | ALPHA | ΔH69/V70, ΔY144, N501Y, A570D, D614G, P681H, T716I, S982A, D1118H |
| GAMMA (BRAZIL/JAPAN) | RVP-708L | BRAZILIAN VARIANT P.1, 20J/501Y.V3 | GAMMA | L18F, T20N, P26S, D138Y, R190S, K417T, E484K, N501Y, D614G , H655Y , T1027I , V1176F |
| DELTA | RVP-763L | INDIAN VARIANT 1.617.2 | DELTA | T19R, G142D, DEL156/157, R158G, L452R, T478K, D614G, P681R, D950N |
| OMICRON | RVP-7687L | OMICRON VARIANT B.1.1.529 | OMICRON | A67V, Δ69-70, T95I, G142D/Δ143-145, Δ211/L212I, INS214EPE, G339D, S371L, S373P, S375F, K417N, N440K, G446S, S477N, T478K, E484A, Q493R, G496S, Q498R, N501Y, Y505H, T547K, D614G, H655Y, N679K, P681H, N764K, D796Y, N856K, Q954H, N969K, L981F |

The effects of PRO-BUD on viral replication were evaluated in an exemplary cell line, SARS-CoV-2 infected Vero 76 cell using various methods described in the METHODS sections above. Pro-BUD has highly significant antiviral activity against SARS-CoV-2, indicated by testing with the Virus Yield Reduction/Neutral Red Toxicity assay, as depicted in FIG. 1. The $EC_{90}$ (compound concentration that reduces viral replication by 90%) of PRO-BUD was 4.1 µg/mL, compared to 8.1 g/mL for the control protease inhibitor. Selectivity Index ($SI_{90}$) was calculated as concentrations $CC_{50}$ (50% cytotoxic, cell-inhibitory)/$EC_{90}$ (compound concentration that reduces viral replication by 90%), by regression analysis with a SI value ≥10 considered as active. The PRO-BUD $SI_{90}$ was >24, while the control $SI_{90}$ was >12.

In some embodiments, PRO-BUD or PRO-DEX significantly reduces viral replication of SARS-CoV-2 in Vero cells. In some embodiments, PRO-BUD or PRO-DEX reduces viral replication of SARS-CoV-2 in Vero cells more effectively than a control protease inhibitor. In some embodiments, PRO-BUD or PRO-DEX reduces viral replication of SARS-CoV-2 in Vero cells more effectively than a control protease inhibitor by at least 10%, 20%, 30%, 40%, and 50%, when measured by Selectivity Index ($SI_{90}$). In some embodiments, PRO-BUD or PRO-DEX reduces viral replication of SARS-CoV-2 in Vero cells more effectively than a control protease inhibitor by at least 10%, 20%, 30%, 40%, 50%, 60%, 70%, 80%, 90%, or 100% when measured by Selectivity Index ($SI_{90}$). In some embodiments, PRO-BUD or PRO-DEX reduces viral replication of SARS-CoV-2 in Vero cells more effectively than a control protease inhibitor by at least 10%, 20%, 30%, 40%, 50%, 60%, 70%, 80%, 90%, or 100% when measured by $EC_{90}$ (compound concentration that reduces viral replication by 90%). In some embodiments, PRO-BUD or PRO-DEX reduces viral replication of SARS-CoV-2 in Vero cells with a $EC_{90}$ that is not more than 4.1 µg/mL. In some embodiments, PRO-BUD or PRO-DEX reduces viral replication of SARS-CoV-2 in Vero cells with a $EC_{90}$ that is not more than 1 µg/mL, 2 µg/mL, 3 µg/mL, 4 µg/mL, 5 µg/mL, 6 µg/mL, 7 µg/mL, 8 µg/mL, 9 µg/mL, 10 µg/mL, 11 µg/mL, 12 µg/mL, 13 µg/mL, 14 µg/mL, 15 µg/mL, 16 µg/mL, 17 µg/mL, 18 µg/mL, 19 µg/mL, 20 µg/mL, 21 µg/mL, 22 µg/mL, 23 µg/mL, 24 µg/mL, 25 µg/mL, 26 µg/mL, 27 µg/mL, 28 µg/mL, 29 µg/mL, 30 µg/mL, 31 µg/mL, 32 µg/mL, 33 µg/mL, 34 µg/mL, 35 µg/mL, 36 µg/mL, 37 µg/mL, 38 µg/mL, 39 µg/mL, 40 µg/mL, 41 µg/mL, 42 µg/mL, 43 µg/mL, 44 µg/mL, 45 µg/mL, 46 µg/mL, 47 µg/mL, 48 µg/mL, 49 µg/mL, 50 µg/mL, 51 µg/mL, 52 µg/mL, 53 µg/mL, 54 µg/mL, 55 µg/mL, 56 µg/mL, 57 µg/mL, 58 µg/mL, 59 µg/mL, 60 µg/mL, 65 µg/mL, 70 µg/mL, 75 µg/mL, 80 µg/mL, 85 µg/mL, 90 µg/mL, 95 µg/mL, 100 µg/mL, 200 µg/mL, 500 µg/mL, or 1 mg/mL.

Reduction of Lung Inflammation

The effects of PRO-BUD on lung inflammation were evaluated in ovalbumin murine model using various methods described in the METHODS sections above. Electron microscopy was used to determine the stability and deposition of PRO-BUD in the lung tissues.

In the Airway Hyperresponsiveness (AHR) to Methacholine (Mch) Challenge, the baseline airway resistance (RL) in normal mice before challenge with Mch was 1.14 cm H20 ml$^{-1}$s (FIG. 2). The baseline RL was greater in the Empty liposome carrier and Daily budesonide treatment groups. At a cumulative dose of 1 mg Mch, RL was increased in all groups. At the 1 mg Mch dose, there was no significant difference between the airway responsiveness of any of the groups of sensitized mice receiving treatment compared to the Sensitized, Untreated group. All the treatment groups except the PRO-BUD treatment group, demonstrated a significant increase in RL compared to the Normal group at a cumulative dose of 3 mg of Mch. There was no significant difference in RL between the Normal Unsensitized, Untreated group and the PRO-BUD treatment group and these were the only two groups with an RL significantly less than the Sensitized, Untreated group.

Figure 3:
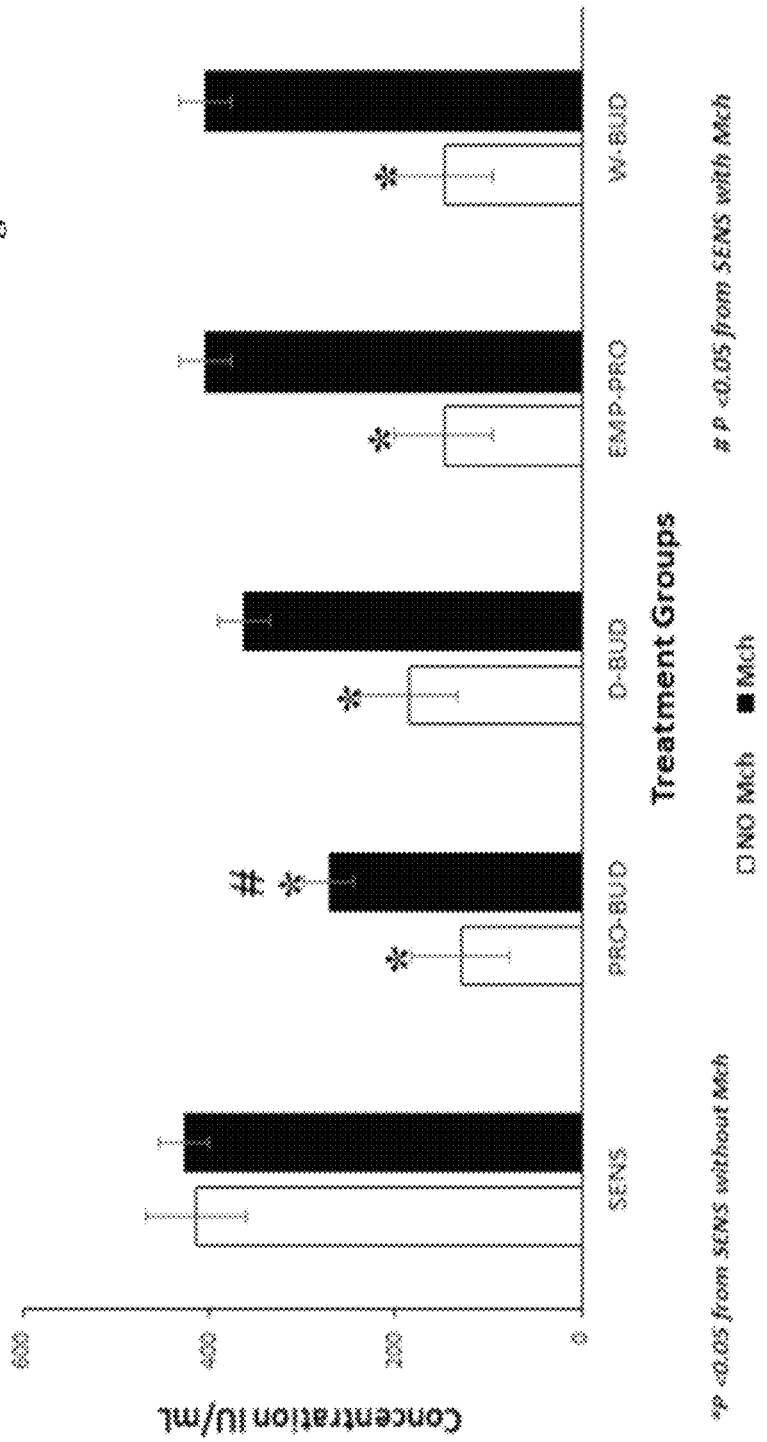
FIG. 3 illustrates the results of Eosinophil Peroxidase (EPO) activity with and without methacholine (mch) challenge in all six treatment groups shown in Table 2.
Figure 4:
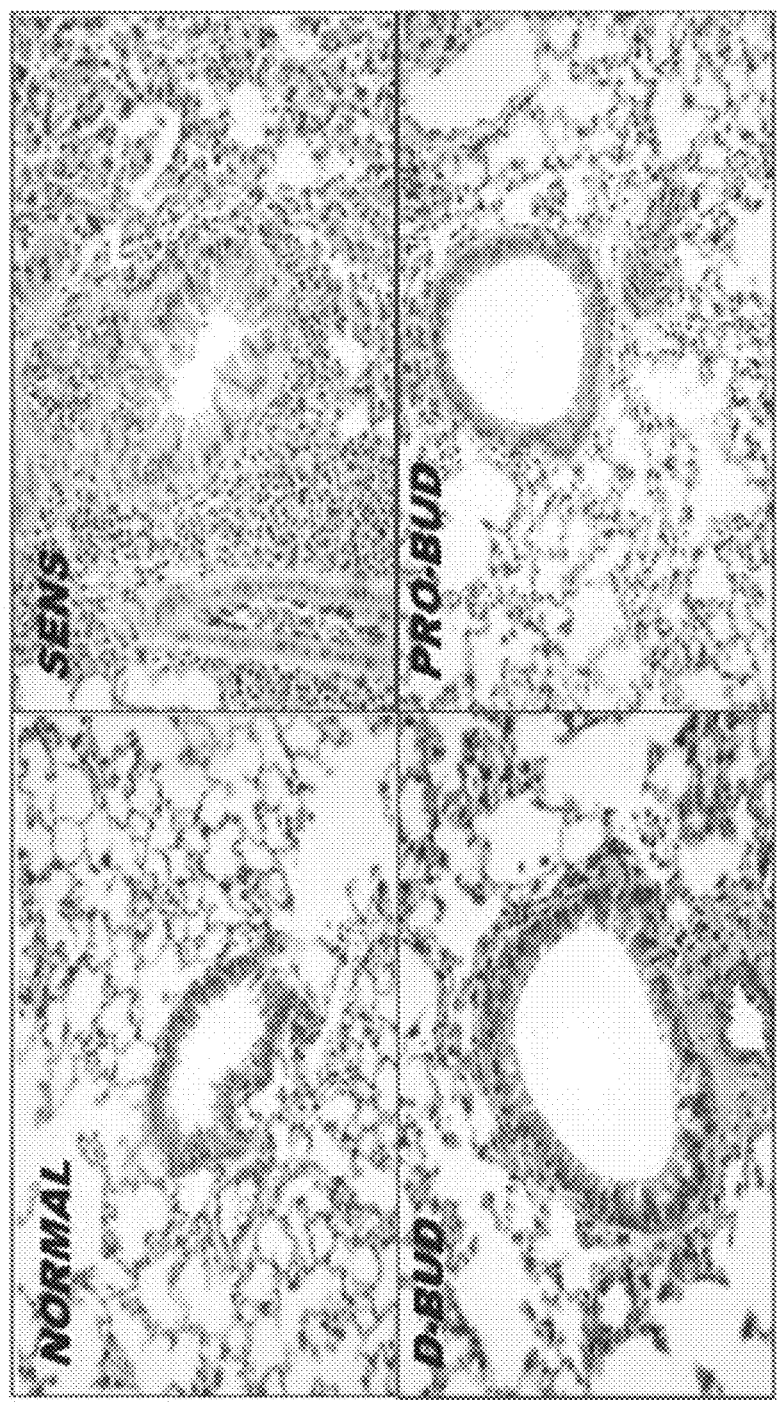
FIG. 4 shows graphical and pictorial presentations of the lung histology without methacholine (mch) challenge in four treatment groups: PRO-BUD, NORMAL, SENS, and D-BUD.
Figure 5:
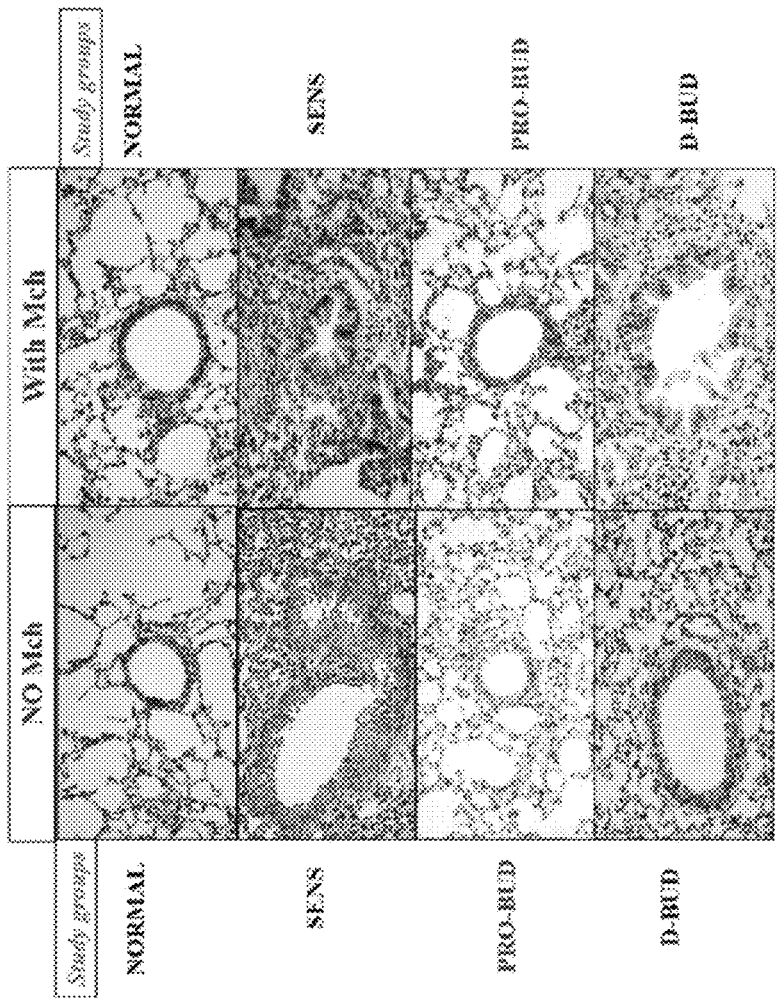
FIG. 5 shows graphical and pictorial presentations of the lung histology with and without airway reactivity (AHR) to methacholine (mch) challenge in four treatment groups: PRO-BUD, NORMAL, SENS, and D-BUD.

In the Eosinophil Peroxidase (EPO) Activity With and Without Methacholine (Mch) Challenge, for the groups without Mch challenge the PRO-BUD (P<0.001) and the Daily budesonide (P<0.001) treatment groups significantly decreased the Eosinophil Peroxidase (EPO) activity in the bronchioalveolar lavage fluid (BAL), when compared to the Sensitized, Untreated group (FIG. 3). Weekly budesonide (P=0.419) and the Empty liposome carrier (P=0.213) treatment groups did not show a significant decrease in EPO activity. With Mch challenge, EPO activity of all groups was increased, except for the PRO-BUD treated group, which showed a significant decrease in EPO activity (P<0.005). There was no significant difference in the EPO activity, with or without Mch challenge, only in the PRO-BUD treated (P=0.68) and the Normal Unsensitized, Untreated group. Normal Unsensitized, Untreated group had no detectable EPO activity in the BAL.

Figure 6:
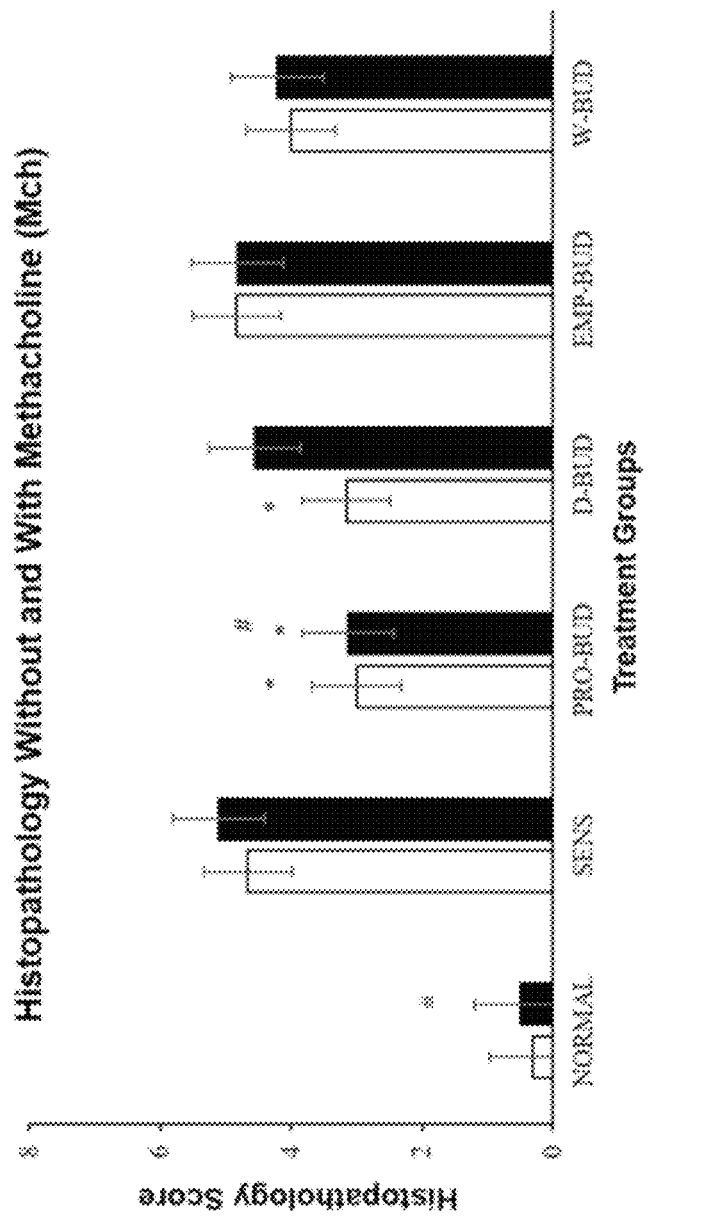
FIG. 6 illustrates the results of lung histopathology scores with and without methacholine (mch) challenge in all six treatment groups shown in Table 2.

Examples of lung tissues from the treatment groups are shown in FIGS. 6 and 7 (100× magnification, hematoxylin-eosin). The lung tissues from the Sensitized, Untreated (SENS) mice had persistent and significant inflammation, including accumulation of inflammatory cells in bronchiolar, peribronchiolar, and perivascular tissues, along with significant submucosal thickening and epithelial hyperplasia, during the 4-week period. Lung inflammation was markedly increased along with bronchoconstriction, cellular infiltrates with methacholine (With Mch) challenge in all the groups except for the Normal Unsensitized, Untreated and PRO-BUD treatment group. PRO-BUD was the only treatment group that did not show a significant increase in lung inflammation, with (With Mch) or without Mch (NO Mch) challenge, when compared to the Sensitized, Untreated group. Daily budesonide treatment group only showed reduction in lung inflammation without Mch challenge. The daily budesonide group treatment group showed marked increase in inflammation along with bronchoconstriction and cellular infiltrates with Mch challenge.

The results from histopathology score with and without methacholine (mch) challenge were shown in FIG. 6. The lung tissues from the Sensitized, Untreated group showed persistent and significant inflammation, without Methacholine (Mch) challenge, including accumulation of inflammatory cells in bronchiolar, peribronchiolar, perivascular tissues, and alveolar regions along with significant submucosal thickening and epithelial hyperplasia, during the four-week period. The inflammation was markedly increased with bronchoconstriction and cellular infiltrates with Mch challenge. There was a significant reduction in total lung histopathology score without Mch challenge, in the PRO-BUD treatment group (P<0.020) and Daily budesonide (P<0.030) treatment groups when compared to the Sensitized, Untreated group. Similar decreases were not observed with the other treatment groups. Only the PRO-BUD treatment group with Mch challenge, had a significant decrease in total histopathology score (P<0.0009) when compared to the Sensitized, Untreated group. None of the other treatment groups (including Daily budesonide treatment group) showed a similar reduction with Mch challenge.

PRO-BUD localizes to type II pneumocytes in the lung, as shown by the scanning electron microscopy results, depicting the deposition of the PRO-BUD in the lung a week after a single dose was administered (FIG. 7). Results show that PRO-BUD was taken up into Type II pneumocytes at the alveolar level in the lung tissues. PRO-BUD was detected up to 10 days post dosing and was not detected at the two-week period after a single dose was administered.

In some embodiments, a corticosteroid encapsulated in a liposome carrier disclosed herein reduces airway hyperresponsiveness (AHR) to methacholine (Mch) challenge more effectively than the same corticosteroid that is not encapsulated in a liposome carrier. In some embodiments, a corticosteroid encapsulated in a liposome carrier disclosed herein reduces airway hyperresponsiveness (AHR) to methacholine (Mch) challenge more effectively by at least 10%, 20%, 30%, 40%, or 50% than the same corticosteroid that is not encapsulated in a liposome carrier. In some embodiments, weekly administration of a corticosteroid encapsulated in a liposome carrier disclosed herein reduces airway hyperresponsiveness (AHR) to methacholine (Mch) challenge more effectively compare to weekly administration of the same corticosteroid that is not encapsulated in a liposome carrier. In some embodiments, weekly administration of a corticosteroid encapsulated in a liposome carrier disclosed herein reduces airway hyperresponsiveness (AHR) to methacholine (Mch) challenge more effectively as compared to daily administration of the same corticosteroid that is not encapsulated in a liposome carrier. In some embodiments, weekly administration of a corticosteroid encapsulated in a liposome carrier disclosed herein reduces airway hyperresponsiveness (AHR) to methacholine (Mch) challenge more effectively as compared to weekly administration of the same corticosteroid that is not encapsulated in a liposome carrier and at the same dose by at least 10%, 20%, 30%, 40% or 50%. In some embodiments, the corticosteroid encapsulated in a liposome carrier disclosed herein is PRO-BUD. In some embodiments, the corticosteroid is BUD. In some embodiments, the corticosteroid is DEX.

In some embodiments, a corticosteroid encapsulated in a liposome carrier disclosed herein reduces lung inflammation more effectively than the same corticosteroid that is not encapsulated in a liposome carrier. In some embodiments, a corticosteroid encapsulated in a liposome carrier disclosed herein reduces lung inflammation more effectively by at least 10%, 20%, 30%, 40% or 50% than the same corticosteroid that is not encapsulated in a liposome carrier and at the same dose when measured by lung histopathology scores with or without Methacholine (Mch) challenge. In some embodiments, a corticosteroid encapsulated in a liposome carrier disclosed herein is administered once every week. In some embodiments, the same corticosteroid that is not encapsulated in a liposome carrier and at the same dose is administered once every week. In some embodiments, the same corticosteroid that is not encapsulated in a liposome carrier and at the same dose is administered once daily. In some embodiments, weekly administration of a corticosteroid encapsulated in a liposome carrier disclosed herein reduces lung inflammation more effectively by at least 10%, 20%, 30%, 40% or 50% than weekly administration of the same corticosteroid that is not encapsulated in a liposome carrier and at the same dose when measured by lung histopathology scores with or without Methacholine (Mch) challenge. In some embodiments, weekly administration of a corticosteroid encapsulated in a liposome carrier disclosed herein reduces lung inflammation more effectively by at least 10%, 20%, 30%, 40% or 50% than daily administration of the same corticosteroid that is not encapsulated in a liposome carrier and at the same dose when measured by lung histopathology scores with Methacholine (Mch) challenge. In some embodiments, the corticosteroid encapsulated in a liposome carrier disclosed herein is PRO-BUD. In some embodiments, the corticosteroid is BUD. In some embodiments, the corticosteroid is DEX.

In some embodiments, a corticosteroid encapsulated in a liposome carrier disclosed herein leads to more decrease in eosinophil peroxidase activity (EPO) than the same corticosteroid that is not encapsulated in a liposome carrier and at the same dose when measured by EPO concentration with or without Mch challenge. In some embodiments, a corticosteroid encapsulated in a liposome carrier disclosed herein leads to at least 10%, 20%, or 30% more decrease in eosinophil peroxidase activity (EPO) than the same corticosteroid that is not encapsulated in a liposome carrier and at the same dose when measured by EPO concentration with or without Mch challenge. In some embodiments, weekly administration of a corticosteroid encapsulated in a liposome carrier disclosed herein leads to at least 10%, 20%, or 30% more decrease in eosinophil peroxidase activity (EPO) than weekly administration of the same corticosteroid that is not encapsulated in a liposome carrier and at the same dose when measured by EPO concentration with or without Mch challenge. In some embodiments, weekly administration of a corticosteroid encapsulated in a liposome carrier disclosed herein leads to at least 10%, 20%, or 30% more decrease in eosinophil peroxidase activity (EPO) than daily administration of the same corticosteroid that is not encapsulated in a liposome carrier and at the same dose when measured by EPO concentration with or without Mch challenge. In some embodiments, the corticosteroid encapsulated in a liposome carrier disclosed herein is PRO-BUD. In some embodiments, the corticosteroid is BUD. In some embodiments, the corticosteroid is DEX.

In some embodiments, a corticosteroid encapsulated in a liposome carrier disclosed herein shows longer effect in decreasing AHR activity with Mch challenge than the same corticosteroid that is not encapsulated in a liposome carrier and at the same dose. In some embodiments, a corticosteroid encapsulated in a liposome carrier disclosed herein shows effect in decreasing AHR or EPO activity with Mch challenge that is at least 2 times, 3 times, 4 times, 5 times, 6 times, 7 times, 8 times, 9 times, 10 times or more than the same corticosteroid that is not encapsulated in a liposome carrier and at the same dose. In some embodiments, a corticosteroid encapsulated in a liposome carrier disclosed herein shows effect in decreasing EPO activity with Mch challenge that is at least 2 times, 3 times, 4 times, 5 times, 6 times, 7 times, 8 times, 9 times, 10 times or more than the same corticosteroid that is not encapsulated in a liposome carrier and at the same dose. In some embodiments, the corticosteroid encapsulated in a liposome carrier disclosed herein is PRO-BUD. In some embodiments, the corticosteroid is BUD. In some embodiments, the corticosteroid is DEX.

In some embodiments, a corticosteroid encapsulated in a liposome carrier disclosed herein decreases AHR to Mch challenge without the addition of a beta agonist, whereas the same corticosteroid that is not encapsulated in a liposome carrier and at the same dose shows no such effect. In some embodiments, a corticosteroid encapsulated in a liposome carrier disclosed herein decreases airway remodeling, whereas the same corticosteroid that is not encapsulated in a liposome carrier and at the same dose shows no such effect. In some embodiments, the same corticosteroid that is not encapsulated in a liposome carrier is administered weekly, daily, once every other day. In some embodiments, a corticosteroid encapsulated in a liposome carrier disclosed herein is administered weekly. In some embodiments, the corticosteroid encapsulated in a liposome carrier disclosed herein is PRO-BUD. In some embodiments, the corticosteroid is BUD. In some embodiments, the corticosteroid is DEX.

Dosing

In some embodiments, a corticosteroid encapsulated in a liposome carrier disclosed herein is delivered as one dose, weekly as an inhalation. In some embodiments, PRO-BUD is delivered once every 5 days, 6 days, 7 days, 8 days, 9 days, 10 days, or 11 days as an inhalation. In some embodiments, a corticosteroid encapsulated in a liposome carrier disclosed herein is delivered at a therapeutically effective amount that is calculated based on the body weight of a subject or the extent of disease progression. In some embodiments, the subject is a human infected with SARS-COV-2. In some embodiments, the disease is COVID-19. In some embodiments, the disease is COVID-19-related respiratory symptoms. In some embodiments, the corticosteroid encapsulated in a liposome carrier disclosed herein is PRO-BUD. In some embodiments, the corticosteroid is the same corticosteroid. In some embodiments, the corticosteroid is DEX.

Corticosteroids encapsulated in a liposome carrier disclosed herein improves patient compliance as it offers a less frequent dosing for chronic respiratory diseases, and for the "long haulers" post COVID-19. Daily dosing of a medication, such as the same corticosteroid or other corticosteroids, lead to problems of noncompliance and treatment failures, which might result in increased hospitalizations and complications. Corticosteroids encapsulated in a liposome carrier disclosed herein, such as PRO-BUD offers a therapy that can be administered in a safe, effective manner as an inhalation, with a low dose of steroid in a carrier similar to composition to surfactant targeted in the lung to the point of viral attachment of SARS-CoV-2. With these unique properties, corticosteroids encapsulated in a liposome carrier disclosed herein, such as PRO-BUD can have a significant impact in treating the COVID-19 Pandemic.

Compositions

The compositions comprising the corticosteroids, such as BUD or DEX for treating a coronavirus disease or inhibiting the viral replication of a virus, can be formulated as a pharmaceutical composition for oral, subcutaneous, sublingual or buccal administration. The formulation can comprise nontoxic therapeutically acceptable carriers, adjuvants, and/or vehicles as desired. The formulation can be in dosage unit as desired.

Formulation of therapeutic agents is discussed in, for example, Hoover, John E., Remington's Pharmaceutical Sciences, Mack Publishing Co., Easton, Pa. (1975), and Liberman, H. A. and Lachman, L., Eds., Pharmaceutical Dosage Forms, Marcel Decker, New York, N.Y. (1980).

The pharmaceutical compositions may be administered per se or in the form of a formulation wherein the active compound(s) is in admixture or mixture with one or more therapeutically acceptable carriers, excipients or diluents. Pharmaceutical compositions may be formulated in conventional manner using one or more therapeutically acceptable carriers comprising excipients and auxiliaries which facilitate processing of the active compounds into preparations which can be used therapeutically. Proper formulation is dependent upon the route of administration chosen.

Compositions described herein can be provided as lyophiles. A lyophilized formulation described here in can be further formulated for oral delivery for instance, in tablet or capsule form. Lyophile compositions described herein can be deposited on a filter paper for oral delivery to a subject. Specific lyophile compositions described herein can comprise additional excipients or stabilizers which in some cases can be useful to stabilize the liposomes in lyophilized form. In some embodiments, lyophile compositions described herein can comprise a sugar, in some cases in an amount sufficient to stabilize the liposomes in lyophilized form. In some embodiments, the sugar can selected from the group consisting of trehalose, glucose, sucrose, maltose, galactose, fructose, and arabinose. In specific embodiments are provided compositions described herein, further comprising an amount of trehalose.

In some cases, lyophile composition described herein can be stable for a period of up to about 3 months. In some cases, lyophile compositions described herein can be stable for a period of up to about 6 months, about 9 months, about 1 year, about 1.5 years, about 2 years, about 2.5 years, about 3 years, about 3.5 years, about 4 years, about 4.5 years or about 5 years. In some cases, after about 6 months, the lyophile composition retains about 100% efficacy. In some cases, after 6 months, the lyophile composition retains about 99%, 97%, 95%, 90%, 85%, 80%, 75% or 70% efficacy.

In some cases, a lyophile compositions described herein is reconstituted prior to administration. In some cases, the administration is oral, subcutaneous or sublingual. In some cases, the administration is intranasal. In some cases, the composition is reconstituted with an appropriate diluent. In some embodiments, the diluent comprises a solvent or co-solvent selected from tert-butyl alcohol, n-butanol, ethanol, iso-propyl alcohol, dimethyl sulfone, chlorobutanol, Sterile Water for Injection, 0.9% sodium chloride solution, 5% dextrose solution, or mixtures thereof. In some cases, the composition is reconstituted with an aqueous diluent. In some cases, the aqueous diluent is selected from the group consisting of: distilled water, deionized water; sterile water; bacteriostatic water; and normal saline.

Examples of suitable coating materials include, but are not limited to, cellulose polymers such as cellulose acetate phthalate, hydroxypropyl cellulose, hydroxypropyl methylcellulose, hydroxypropyl methylcellulose phthalate and hydroxypropyl methylcellulose acetate succinate; polyvinyl acetate phthalate, acrylic acid polymers and copolymers, and methacrylic resins that are commercially available under the trade name Eudragit® (Roth Pharma, Westerstadt, Germany), zein, shellac, and polysaccharides.

Additionally, the coating material may contain conventional carriers such as plasticizers, pigments, colorants, glidants, stabilization agents, pore formers and surfactants.

Therapeutically acceptable excipients present in the drug-containing tablets, beads, granules or particles include, but are not limited to, diluents, binders, lubricants, disintegrants, colorants, stabilizers, and surfactants. Diluents, also referred to as "fillers," are typically necessary to increase the bulk of a solid dosage form so that a practical size is provided for compression of tablets or formation of beads and granules. Suitable diluents include, but are not limited to, dicalcium phosphate dihydrate, calcium sulfate, lactose, sucrose, mannitol, sorbitol, cellulose, microcrystalline cellulose, kaolin, sodium chloride, dry starch, hydrolyzed starches, pregelatinized starch, silicon dioxide, titanium oxide, magnesium aluminum silicate and powdered sugar.

Binders are used to impart cohesive qualities to a solid dosage formulation, and thus ensure that a tablet or bead or granule remains intact after the formation of the dosage forms. Suitable binder materials include, but are not limited to, starch, pregelatinized starch, gelatin, sugars (including sucrose, glucose, dextrose, lactose and sorbitol), polyethylene glycol, waxes, natural and synthetic gums such as acacia, tragacanth, sodium alginate, cellulose, including hydroxypropylmethylcellulose, hydroxypropylcellulose, ethylcellulose, and veegum, and synthetic polymers such as acrylic acid and methacrylic acid copolymers, methacrylic acid copolymers, methyl methacrylate copolymers, aminoalkyl methacrylate copolymers, polyacrylic acid/polymethacrylic acid and polyvinylpyrrolidone.

Lubricants are used to facilitate tablet manufacture. Examples of suitable lubricants include, but are not limited to, magnesium stearate, calcium stearate, stearic acid, glycerol behenate, polyethylene glycol, talc, and mineral oil.

Disintegrants are used to facilitate dosage form disintegration or "breakup" after administration, and generally include, but are not limited to, starch, sodium starch glycolate, sodium carboxymethyl starch, sodium carboxymethylcellulose, hydroxypropyl cellulose, pregelatinized starch, clays, cellulose, alginine, gums or cross linked polymers, such as cross-linked PVP (Polyplasdone XL from GAF Chemical Corp).

Stabilizers are used to inhibit or retard drug decomposition reactions which include, by way of example, oxidative reactions.

Surfactants may be anionic, cationic, amphoteric or nonionic surface active agents. Suitable anionic surfactants include, but are not limited to, those containing carboxylate, sulfonate and sulfate ions.

Examples of anionic surfactants include sodium, potassium, ammonium of long chain alkyl sulfonates and alkyl aryl sulfonates such as sodium dodecylbenzene sulfonate; dialkyl sodium sulfosuccinates, such as sodium dodecylbenzene sulfonate; dialkyl sodium sulfosuccinates, such as sodium bis-(2-ethylthioxyl)-sulfosuccinate; and alkyl sulfates such as sodium lauryl sulfate. Cationic surfactants include, but are not limited to, quaternary ammonium compounds such as benzalkonium chloride, benzethonium chloride, cetrimonium bromide, stearyl dimethylbenzyl ammonium chloride, polyoxyethylene and coconut amine. Examples of nonionic surfactants include ethylene glycol monostearate, propylene glycol myristate, glyceryl monostearate, glyceryl stearate, polyglyceryl-4-oleate, sorbitan acylate, sucrose acylate, PEG-150 laurate, PEG-400 monolaurate, polyoxyethylene monolaurate, polysorbates, polyoxyethylene octylphenylether, PEG-1000 cetyl ether, polyoxyethylene tridecyl ether, polypropylene glycol butyl ether, Poloxamer® 401, stearoyl monoisopropanolamide, and polyoxyethylene hydrogenated tallow amide. Examples of amphoteric surfactants include sodium N-dodecyl-β-alanine, sodium N-lauryl-β-iminodipropionate, myristoamphoacetate, lauryl betaine and lauryl sulfobetaine.

If desired, the tablets, beads, granules, or particles may also contain minor amount of nontoxic auxiliary substances such as wetting or emulsifying agents, dyes, pH buffering agents, or preservatives.

The compounds may be complexed with other agents as part of their being therapeutically formulated. The pharmaceutical compositions may take the form of, for example, tablets or capsules prepared by conventional means with therapeutically acceptable excipients such as binding agents (e.g., acacia, methylcellulose, sodium carboxymethylcellulose, polyvinylpyrrolidone (Povidone), hydroxypropyl methylcellulose, sucrose, starch, and ethylcellulose); fillers (e.g., corn starch, gelatin, lactose, acacia, sucrose, microcrystalline cellulose, kaolin, mannitol, dicalcium phosphate, calcium carbonate, sodium chloride, or alginic acid); lubricants (e.g. magnesium stearates, stearic acid, silicone fluid, talc, waxes, oils, and colloidal silica); and disintegrators (e.g. micro-crystalline cellulose, corn starch, sodium starch glycolate and alginic acid. If water-soluble, such formulated complex then may be formulated in an appropriate buffer, for example, phosphate buffered saline or other physiologically compatible solutions.

Alternatively, if the resulting complex has poor solubility in aqueous solvents, then it may be formulated with a non-ionic surfactant such as TWEEN™, or polyethylene glycol. Thus, the compounds and their physiologically acceptable solvates may be formulated for administration.

Liquid formulations (e.g. for oral administration) prepared in water or other aqueous vehicles may contain various suspending agents such as methylcellulose, alginates, tragacanth, pectin, kelgin, carrageenan, acacia, polyvinylpyrrolidone, and polyvinyl alcohol. The liquid formulations may also include solutions, emulsions, syrups and elixirs containing, together with the active compound(s), wetting agents, sweeteners, and coloring and flavoring agents. Various liquid and powder formulations can be prepared by conventional methods for inhalation by the patient.

Delayed release and extended release compositions (e.g., for buccal administration) can be prepared. The delayed release/extended release pharmaceutical compositions can be obtained by complexing therapeutic agent with a therapeutically acceptable ion-exchange resin and coating such complexes. The formulations are coated with a substance that will act as a barrier to control the diffusion of the therapeutic agent from its core complex into the gastrointestinal fluids. Optionally, the formulation is coated with a film of a polymer which is insoluble in the acid environment of the stomach, and soluble in the basic environment of lower GI tract in order to obtain a final dosage form that releases less than 10% of the therapeutic agent dose within the stomach.

In addition, combinations of immediate release compositions and delayed release/extended release compositions may be formulated together.

Lyophilization Methods

Lyophilization is the technical name for a process often referred to as "freeze-drying." In this process, an aqueous mixture or suspension is frozen into a solid, then it is generally subjected to a vacuum for a substantial period of time. The vacuum causes the water molecules to sublimate.

The methods described herein include the step of lyophilizing the composition comprising a sterically stabilized liposome carrier as described herein. In one embodiment, lyophilization occurs after sterilization. In one embodiment, during the lyophilization process, the solvent system used, such as by way of example only, tert-butyl alcohol and Sterile Water for Injection is substantially removed by sublimation. In another embodiment, less than about 5% residual solvent remains after lyophilization; in other embodiments, less than about 3% remains; in yet other embodiments, less than about 2% remains; in further embodiments, less than about 1% or about 0.1% remains.

In one embodiment, the lyophilization process comprises the steps of (1) placing the sample to be lyophilized (composition comprising sterically stabilized liposome carrier and optionally an active agent) in a suitable vial and placing the vial into a lyophilization chamber and lowering the shelf temperature to about −30° C. to about −50° C. at atmospheric pressure; (2) holding the shelf temperature at the temperature range described above until the temperature of the sample is about −30° C. to about −50° C.; (3) raising the temperature to about −10° C. to about −20° C. to anneal the lyophile for about 1 to 2 hours; (4) lowering the shelf temperature to about −30° C. to about −50° C. and reducing the pressure of the system to about 50 mTorr to about 100 mTorr; and holding until sublimation of the solvent system is substantially complete. The temperature of the product should be below about −25° C. to about −28° C. to avoid cake collapse; (5) increasing the temperature to about 30° C. to about 50° C.; and (6) allowing the samples to reach a temperature of about 20° C. to about 30° C. for an amount of time to remove bound water or solvent levels; (7) backfilling vials with nitrogen or appropriate gas after which the vials are aseptically sealed. In one embodiment, the process requires a step-wise lowering or increasing of the temperature of the system, such as, at a rate of 0.5° C. per minute up to about 1° C. per minute to ensure proper and substantially complete sublimation. The lyophilization step provides a composition comprising sterically stabilized liposome carrier and optionally an active agent, such as for example, an allergen or a steroid or a combination thereof, that can be stored at room temperature for extended periods of time. Additionally, the lyophilized compositions (also referred to as lyophiles) described herein are stable for a period of at least 4 weeks at a temperature of about 0° C. to about 50° C. In some embodiments, the lyophilized compositions are stable from at least about 3 months to at least about 5 years at a temperature of about 0° C. to about 50° C. In certain embodiments, the lyophilized compositions are stable for a period of at least about 4 months to at least about 4 years at a temperature of about 0° C. to about 50° C. In still further or additional embodiments, the lyophilized compositions are stable for a period of at least about 6 months to at least about 2 years at a temperature of about 0° C. to about 50° C. In some embodiments, the lyophilized compositions are stable for at least about 3 months, at least about 6 months, at least about 1 year, at least about 2 years, at least about 3 years, at least about 4 years, or at least about 5 years at a temperature of about 0° C. to about 50° C. In other embodiments, the lyophiles described herein are in the form of a cake or free flowing powder. In other embodiment, the lyophilized composition is a cake.

Reconstitution

In some embodiments, the lyophiles described herein readily reconstitute once contacted with a sufficient amount of a pharmaceutically acceptable carrier or diluent. For example, in some embodiments, the lyophile is mixed in the vial it is contained in, e.g., shaken for about 1 to about 3 minutes, with a pharmaceutically acceptable carrier, such as, Sterile Water for Injection, 0.9% sodium chloride solution, or 5% dextrose solution to provide a reconstituted composition suitable for subcutaneous injection. In one embodiment, the lyophile is reconstituted in a relatively short period of time, such as for example, less than 1 minute, less than 30 seconds, and in other embodiments, about 20 seconds. In certain embodiments, the lyophiles reconstitute in a time of less than 2, 3, 4, or 5 minutes. These short reconstitution times provide an advantage in that the therapeutic agent has not decomposed from exposure in a solution for an extended period of time prior to administration. In one embodiment, the reconstituted composition is suitable for subcutaneous administration, such as for example, subcutaneous injection.

In another embodiment, the reconstituted form is a non-suspension. In a further embodiment, the reconstituted form is a clear solution and remains substantially clear prior to administration.

A feature of the subject matter described herein is a lyophilized composition is formulated with a minimal amount of trehalose, that is manufactured as a lyophile, and that is amenable to full reconstitution with a carrier or diluents in a short period of time.

Route of Administration

Compositions described herein can be administered orally, sublingually, buccally, subcutaneously, intramuscularly, rectally, intradermally, transdermally, by inhalation, or topically. In some cases, the compositions can be administered via subcutaneous injection, or infusion techniques. In some cases, the pharmaceutical composition is suitable for subcutaneous, sublingual, or oral administration, but not inhalation or pulmonary delivery. In some cases, the composition is administered orally. In some cases, the composition is administered subcutaneously. In some cases, the composition is administered sublingually. In some cases, the composition is administered buccally.

EXAMPLES

The following examples are provided to further illustrate some embodiments of the present disclosure, but are not intended to limit the scope of the disclosure; it will be understood by their exemplary nature that other procedures, methodologies, or techniques known to those skilled in the art may alternatively be used.

Example 1

Example 1. Aerosol PRO-BUD Application—Study Groups and Various Treatments

This example illustrates the different treatment groups used to evaluate the effects of PRO-BUD in treating COVID-19, according to some embodiments of the present disclosure.

The study groups and treatments are briefly summarized in Table 2.

Treatment Groups: D-BUD=Treatment with 20 μg of budesonide only, administered daily to sensitized mice with inflammation. PRO-BUD=20 μg of budesonide in the Liposome carrier, administered as one dose, once a week to sensitized mice with inflammation. EMP-PRO=Treatment with Empty buffer-loaded, Liposome carrier, administered once a week to sensitized mice with inflammation. W-BUD=Treatment with budesonide only, administered once a week to sensitized mice with inflammation.

Control Groups: NORMAL=Normal, Untreated, Unsensitized mice. SENS=Sensitized, Untreated, mice with inflammation.

Example 2

Example 2. Quantitative Histopathology Scoring System

This example demonstrates the Quantitative Histopathology Scoring System that is used to evaluate the effects of PRO-BUD on lung histopathology, according to some embodiments of the present disclosure. The various metrics for scoring the lung histopathology are briefly summarized in FIG. 2.

Histopathologic examination was performed lungs that were removed and fixed with 10% phosphate-buffered formalin. Tissue samples were taken from the trachea, bronchi, large and small bronchioles, interstitium, alveoli, and pulmonary blood vessels. The tissue slides were stained with hematoxylin and eosin, and analyzed through use of light microscopy at a magnification of 100×. Coded slides were examined by a veterinary pathologist, in a blinded fashion, for evidence of inflammatory changes, including (1) bronchiolar epithelial hyperplasia and wall thickening, (2) bronchiolar, peribronchiolar, and perivascular edema, and (3) accumulation of eosinophils, neutrophils, and mononuclear inflammatory cells. Each of the parameters evaluated was given an individual numerical score. The cumulative score was obtained through use of the individual scores; inflammation was designated as none (score, 0), mild (score, 1-2), moderate inflammation (score, 3-4), or severe inflammation (score, 5-6).

Example 3

Example 3. Aerosol PRO-BUD Application—PRO-BUD Activity in Vero Cells Infected with SARS-COV-2

This example demonstrates the increased PRO-BUD activity in Vero cells infected with SARS-COV-2 as compared to a control protease inhibitor, according to some embodiments of the present disclosure. The results for this experiment are briefly summarized in FIG. 1.

PRO-BUD showed highly significant antiviral activity against SARS-CoV-2, as indicated by testing with the Virus Yield Reduction/Neutral Red Toxicity assay. The 50% effective (EC50, virus-inhibitory) concentrations and 50% cytotoxic (CC50, cell-inhibitory) concentrations were then calculated by regression analysis. The quotient of CC50 divided by EC50 gives the selectivity index (SI) value, with compounds having a SI value >10 being considered active. The EC90 (compound concentration that reduces viral replication by 90%) of PRO-BUD was 4.1 μg/mL, compared to 8.1 g/mL for the control protease inhibitor. The SI90 calculated as CC50/EC90 for PRO-BUD was >24, and for the control was >12.

Example 4

Example 4. Aerosol PRO-BUD Application—Airway Reactivity (AHR) to Methacholine (Mch) Challenge This example characterizes that PRO-BUD leads to lower increase in airway reactivity to methacholine as compared to the other BUD treatment groups, according to some embodiments of the present disclosure. The results for this experiment are briefly summarized in FIG. 2.

Treatment Groups: D-BUD=Treatment with 20 μg of budesonide only, administered daily to sensitized mice with inflammation. PRO-BUD=20 μg of budesonide in the liposome carrier (PRO-BUD) administered as one dose, once a week to sensitized mice with inflammation. EMP-PRO=Treatment with Empty buffer-loaded, liposome carrier, administered once a week to sensitized mice with inflammation. W-BUD=Treatment with budesonide only, administered once a week to sensitized mice with inflammation.

Control Groups: NORMAL=Normal, Untreated, Unsensitized mice. SENS=Sensitized, Untreated, mice with inflammation.

Airway Reactivity (AHR) to Methacholine (Mch) Challenge was measured as resistance (R in cm $H_2O/ml/s$). Data is shown for baseline which is no Mch challenge (gray bar, with 1 mg Mch challenge (white bar), and 3 mg Mch challenge (dark bar). The baseline $R_L$ was greater in the Empty.

Liposome carrier (EMP-PRO) and Daily budesonide (D-BUD) treatment groups. At a cumulative dose of 1 mg Mch, RL was increased in all groups. At the 1 mg Mch dose, there was no significant difference between the airway responsiveness of any of the groups of sensitized mice receiving treatment compared to the Sensitized, Untreated (SENS) group. All the treatment groups except the PRO-BUD treatment group, demonstrated a significant increase in RL compared to the Normal Unsensitized, Untreated (NORMAL) group at a cumulative dose of 3 mg of Mch. There was no significant difference in RL between the Normal Unsensitized, Untreated (NORMAL) group and the PRO-BUD treatment groups and there were the only groups with an RL significantly less than the Sensitized, Untreated (SENS) group.

Example 5

Example 5. Aerosol PRO-BUD Application—Eosinophilic Peroxidase Activity (EPO) with and without Methacholine (Mch) Challenge This example demonstrates that PRO-BUD leads to lower EOP activity as compared to the other BUD treatment groups, according to some embodiments of the present disclosure. The results for this experiment are briefly summarized in FIG. 3.

Treatment Groups: D-BUD=Treatment with 20 µg of budesonide only, administered daily to sensitized mice with inflammation. PRO-BUD=20 µg of budesonide in the liposome carrier (PRO-BUD) administered as one dose, once a week to sensitized mice with inflammation. EMP-PRO=Treatment with Empty buffer-loaded, liposome carrier, administered once a week to sensitized mice with inflammation. W-BUD=Treatment with budesonide only, administered once a week to sensitized mice with inflammation.

Control Groups: NORMAL=Normal, Untreated, Unsensitized mice. SENS=Sensitized, Untreated, mice with inflammation.

Graph represents cumulative results from a 4-week study of eosinophilic peroxidase activity (EPO), a marker of inflammation, measured in bronchoalveolar lavage fluid (BAL) and Airway Reactivity (AHR) to Methacholine (Mch) Challenge. In the groups Without Mch(NO Mch) challenge all the treatment groups showed a significant decrease in EPO activity, when compared to the Sensitized, Untreated (SENS) group. Only the weekly treatments with PRO-BUD significantly decreased EPO activity, with Mch and without Mch (NO Mch) challenge when compared to the Sensitized, Untreated (SENS) group. Daily budesonide (D-BUD), Weekly budesonide (WK-BUD and the Empty liposome carrier (EMP-PRO) treatment groups did not show a significant decrease in EPO activity with Mch challenge.

Example 6

Example 6. Aerosol PRO-BUD Application—Lung Histology, with and without Methacholine (Mch) Challenge This example demonstrates that PRO-BUD leads to better lung histology as compared to the other BUD treatment groups, according to some embodiments of the present disclosure. The lung histology pictures are summarized in FIGS. 6-7.

Treatment Groups: D-BUD=Treatment with 20 µg of budesonide only, administered daily to sensitized mice with inflammation. PRO-BUD=20 µg of budesonide in the liposome carrier, (PRO-BUD) administered as one dose, once a week to sensitized mice with inflammation. EMP-PRO=Treatment with Empty buffer-loaded, liposome carrier, administered once a week to sensitized mice with inflammation. W-BUD=Treatment with budesonide only, administered once a week to sensitized mice with inflammation.

Control Groups: NORMAL=Normal, Untreated, Unsensitized mice. SENS=Sensitized, Untreated, mice with inflammation.

Examples of lung tissues from the treatment groups are shown in FIGS. 6-7 (100× magnification, hematoxylin-eosin). The lung tissues from the Sensitized, Untreated (SENS) mice had persistent and significant inflammation, including accumulation of inflammatory cells in bronchiolar, peribronchiolar, and perivascular tissues, along with significant submucosal thickening and epithelial hyperplasia, during the 4-week period. Lung inflammation was markedly increased along with bronchoconstriction, cellular infiltrates with methacholine (With Mch) challenge in all the groups except for the NORMAL and PRO-BUD treatment groups. PRO-BUD was the only treatment group that did not show a significant increase in lung inflammation, with (With Mch) or without Mch (NO Mch) challenge, when compared to the Sensitized, Untreated (SENS) group. Daily budesonide treatment (D-BUD) group only showed reduction in lung inflammation without Mch challenge. The daily budesonide group (D-BUD) group showed marked increase in inflammation along with bronchoconstriction and cellular infiltrates with Mch challenge.

Example 7

Example 7. Aerosol PRO-BUD Application—Lung Histopathology Scores with and without Methacholine (Mch) Challenge This example demonstrates that PRO-BUD leads to better lung histopathology score as compared to the other BUD treatment groups, according to some embodiments of the present disclosure. The lung histology pictures are summarized in FIG. 6.

Treatment Groups: D-BUD=Treatment with 20 µg of budesonide only, administered daily to sensitized mice with inflammation. PRO-BUD=20 µg of budesonide in the liposome carrier, (PRO-BUD) administered as one dose, once a week to sensitized mice with inflammation. EMP-PRO=Treatment with Empty buffer-loaded, liposome carrier, administered once a week to sensitized mice with inflammation. W-BUD=Treatment with budesonide only, administered once a week to sensitized mice with inflammation.

Control Groups: NORMAL=Normal, Untreated, Unsensitized mice. SENS=Sensitized, Untreated, mice with inflammation.

FIG. 3 depicts the cumulative histopathology score from a 4-week study, with and without methacholine (Mch) challenge. Scores were obtained from a scoring system as illustrated in Table 3 and were determined by a veterinary pathologist blinded to the treatment groups. The lung tissues from the Sensitized, Untreated (SENS) group had persistent and significant inflammation, without methacholine (No Mch) challenge which was increased with methacholine challenge (With Mch). There was a significant reduction in total lung histopathology score without Mch challenge, in the PRO-BUD and Daily budesonide (D-BUD) treatment groups when compared to the Sensitized, Untreated (SENS) group. Similar decreases were not observed with the other treatment groups. Only the PRO-BUD treatment group with the Mch challenge, had a significant decrease in total histopathology score when compared to the Sensitized, Untreated (SENS) group. There was also a significant decrease in lung inflammation in the PRO-BUD group in comparison with the Weekly budesonide (NM-BUD) group. None of the other treatment groups, including the Daily budesonide (D-BUD) treatment group, Weekly budesonide (WK-BUD), or Empty liposome carrier (EMP-PRO) treatment groups showed a similar reduction with Mch challenge.

Example 8

Example 8. Aerosol PRO-BUD Application—PRO-BUD Localizes to Type II Pneumocytes in the Lung This example demonstrates that PRO-BUD localizes to type II pneumocytes in the lung, according to some embodiments of the present disclosure. The lung histology pictures with PRO-BUD are summarized in FIG. 7.

Scanning electron microscopy showed the deposition of PRO-BUD in the lung after a week after a single dose was administered. Arrows depict the swirls inside the Type II pneumocytes. Top left lower magnification and top right higher magnification. PRO-BUD was taken up into the Type II pneumocytes at the alveolar level in the lung tissues.

In the present study, it was demonstrated that PRO-BUD showed significant inhibition on viral replication of SARS-CoV-2-infected cells with the selectivity index (SI) value >24. Weekly PRO-BUD and daily budesonide therapy significantly decreased lung inflammation and EPO in BAL. PRO-BUD localized in type II pneumocytes, and was the only group to significantly decrease AHR, and EPO in BAL with Mch challenge. PRO-BUD significantly inhibited viral replication in SARS-CoV-2 infected cells and localized into type II pneumocytes, decreased lung inflammation, AHR and EPO activity with Mch challenge. This novel use of liposome encapsulated formulation for BUD and other corticosteroids offers a potential inhalational treatment for COVID-19 and other viral respiratory disease caused by a SARS-associated coronavirus.

Example 9

Example 9. Aerosol Application of PRO-DEX

The aerosol application of PRO-DEX for inhibiting viral replication and reducing lung inflammation will be evaluated based on the same methods used for PRO-BUD as described in Examples 1-8.

The liposome preparation will be similar to the procedures used in the METHODS—Liposome Preparation section. The Treatment Groups will include: D-DEX=Treatment with 20 μg of dexamethasone only, administered daily to sensitized mice with inflammation. PRO-DEX=20 μg of dexamethasone in the Liposome carrier, administered as one dose, once a week to sensitized mice with inflammation. EMP-PRO=Treatment with Empty buffer-loaded, Liposome carrier, administered once a week to sensitized mice with inflammation. W-DEX=Treatment with dexamethasone only, administered once a week to sensitized mice with inflammation. Control Groups: NORMAL=Normal, Untreated, Unsensitized mice. SENS=Sensitized, Untreated, mice with inflammation.

All treatment groups will be evaluated for their antiviral activity against SARS-CoV-2, as indicated by testing with the Virus Yield Reduction/Neutral Red Toxicity assay, Airway Reactivity (AHR) to Methacholine (Mch) Challenge, Eosinophilic Peroxidase Activity (EPO) With and Without Methacholine (Mch) Challenge, lung histology score with and without methacholine (Mch) challenge, and localization to Type II pneumocytes in the lung.

Example 10

Example 10. Oral Application of BUD and DEX Using pH Sensitive and pH Resistant Liposome Carrier Delivery System The safety and efficacy of oral application of PRO-BUD and PRO-DEX will be accessed with two sets of experiments, each with four groups, as shown in Table 5 and Table 6 below.

TABLE 5

PRO-BUD group assignment

| | Group 1 | Group 2 | Group 3 | Group 4 |
|---|---|---|---|---|
| Set 1 | Untreated group | Conventional Treatment | pH sensitive delivery system given with encapsulated BUD | pH sensitive delivery system given with BUD |
| Set 2 | Untreated group | Conventional Treatment | pH resistant delivery system given with encapsulated BUD | pH resistant delivery system given with BUD |

TABLE 6

PRO-DEX group assignment

| | Group 1 | Group 2 | Group 3 | Group 4 |
|---|---|---|---|---|
| Set 1 | Untreated group | Conventional Treatment | pH resistant delivery system given with encapsulated DEX | pH resistant delivery system given with DEX |
| Set 2 | Untreated group | Conventional Treatment | pH resistant delivery system given with encapsulated DEX | pH resistant delivery system given with DEX |

The liposome preparation will be similar to the procedures used in the METHODS—Liposome Preparation section. Specifically, the conventional treatment will use BUD or DEX encapsulated in a conventional carrier of phosphatidylglycerol:phosphatidylcholine:cholesterol at 2:8:5. In one example, the delivery systems will use PG:PC:Cholesterol:PEG-DSPE at 2:8:5:0.5. In another example, the delivery systems will be PG:PC:PEG-DSPE at 2:8:0.5.

Various pH sensitive and pH resistant delivery vehicles exist, and these examples are not meant to be limiting. In this comparison, in the pH resistant delivery system, the liposome will be phosphatidylglycerol (PG): phosphatidylcholine (PC): POPG: POPC. The liposome will be made without cholesterol. In the pH sensitive delivery system, the liposome will be PC: PG: POPG: POPC. The pH-sensitive component will be N-palmitoyl homocysteine (PHC), with the same molar amount as PEG-DSPE. The pH sensitive liposome may be made with or without cholesterol, or both with and without cholesterol (e.g., for a Group 5 and Group 6).

Example 11

Example 11. Treating COVID-19 Using BUD and DEX with pH Sensitive and pH Resistant Liposome Carrier Delivery System Four groups of experiments will be compared to evaluation the safety and efficacy of the pharmaceutical formulation in treating COVID-10: untreated, placebo group, pH sensitive formulation (with BUD or DEX), and pH resistance formulation (with BUD or DEX), as shown in Table 7.

TABLE 7

Treatment group assignment

| Untreated group | Placebo control to receive solution of similar volume once a week | pH sensitive formulation with BUD given orally once a week | pH resistant formulation with BUD given orally once a week |
| Untreated group | Placebo control to receive solution of similar volume once a week | pH sensitive formulation with DEX given orally once a week | pH resistant formulation with DEX given orally once a week |

The liposome preparation will be similar to the procedures used in the METHODS—Liposome Preparation section. Dosage will administer per the standard dosing protocol for that particular drug. The drug will be encapsulated in the liposome carrier to be dosed once a week for a period of 6 weeks. Symptom scores will be recorded. Patients will be followed once a week to monitor them for urine and blood tests as well as examination.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of targeting delivery of an active agent to a point of viral attachment of a coronavirus to inhibit viral replication, the method comprising:
   administering a pharmaceutical composition in a subject in need thereof, wherein the pharmaceutical composition comprises the active agent encapsulated in a liposome carrier,
      wherein the liposome carrier comprises phosphatidylglycerol (PG), phosphatidylcholine (PC), and about 1% to about 5% polyethylene glycol distearoylphosphatidylethanolamine (PEG-DSPE), and
      wherein the liposome carrier targets alveolar Type II pneumocytes and inhibits viral replication,
   thereby targeting delivery of the active agent to the point of viral attachment to inhibit viral replication of the coronavirus.

2. The method of claim 1, wherein the coronavirus comprises SARS-CoV-2 or a variant thereof.

3. The method of claim 1, wherein the active agent comprises cromolyn sodium, albuterol sulfate, terbutaline, albuterol, ipratropium, pirbuterol, epinephrine, salmeterol, levalbuterol, formoterol, or a combination thereof.

4. The method of claim 1, wherein the active agent comprises a leukotriene inhibitor, and wherein the leukotriene inhibitor comprises montelukast, zafirlukast, zileuton, or an equivalent thereof.

5. The method of claim 1, wherein the active agent comprises Secretory Leukocyte Peptidase inhibitors, including SLPI, apol lipoprotein A-1 mimetics, including D-4F, monophosphoryl lipid A, or a combination thereof.

6. The method of claim 1, wherein the active agent comprises an antihistamine.

7. The method of claim 1, wherein the active agent comprises serine protease inhibitor.

8. The method of claim 1, wherein the active agent comprises an antibiotic, and wherein the antibiotic comprises amikacin, gentamicin, tobramycin, rifapentine, rifabutin, sparfloxacin, ciprofloxacin, quinolones, azithromycin, erythromycin, isoniazid, or a combination thereof.

9. The method of claim 1, wherein the active agent comprises a corticosteroid, and wherein the corticosteroid comprises budesonide, flunisolide, triamcinolone, beclomethasone, fluticasone, mometasone, dexamethasone, hydrocortisone, methylprednisolone, prednisone, cortisone, betamethasone, or any combination or derivative thereof.

10. The method of claim 1, wherein the pharmaceutical composition comprises an aerosol formulation.

11. The method of claim 10, wherein the aerosol formulation has an effective life of at least two days and up to two weeks in the subject after the administering.

12. The method of claim 11, wherein the aerosol formulation has an effective life that is at least twice of an effective life of a corresponding formulation without the liposome carrier after administering to the subject.

13. The method of claim 1, wherein the administering comprises: (a) reducing levels of one or more of IL-6, IgE or eosinophils; (b) decreasing Eosinophil Peroxidase (EPO) activity in the bronchioalveolar lavage fluid (BAL) relative to levels prior to the administering; (c) reducing airway hyperresponsiveness (AHR) to Methacholine (Mch) relative to levels prior to the administering; or (d) any combination thereof.

14. The method of claim 1, wherein the administering comprises reducing lung inflammation, a marker of respiratory inflammation, or a combination thereof.

15. The method of claim 1, wherein the pharmaceutical composition is substantially devoid of cholesterol.

16. The method of claim 1, wherein the liposome carrier further comprises phosphatidylethanolamine (PE), phosphatidylserine (PS), phosphatidylinositol (PI), or any combination or derivative thereof.

17. The method of claim 1, wherein the liposome carrier comprises a membrane portion, and wherein at least about 50%, about 60%, about 70% or about 75% of the active agent is displaced within the membrane portion of the liposome carrier at the time of the administration.

18. The method of claim 1, wherein the pharmaceutical composition contains about 1% to about 33% of the active agent.

19. The method of claim 1, wherein the pharmaceutical composition contains about 60% to about 99% PG, PC, PE, PS, PI, or a combination thereof.

20. The method of claim 1, wherein the pharmaceutical composition contains about 60% to about 99% synthetic palmitoyloleoyl-PG (POPG), polyoxyethylene (POE), synthetic palmitoyloleoyl-PC (POPC), or a combination thereof.

21. The method of claim 1, further comprising administering an additional pharmaceutical composition comprising the active agent or a second agent.

22. The method of claim 21, wherein the second agent comprises an agent suitable for treating an infection of the coronavirus.

23. The method of claim 22, wherein the second agent comprises an agent suitable for inhibiting viral replication of the coronavirus.

24. The method of claim 22, wherein the second agent is administered before, after, or concurrently with administration of the pharmaceutical composition comprising the active agent encapsulated in the liposome carrier.

25. The method of claim 22, wherein the second agent is a monoclonal antibody, a protease inhibitor, an RNA-dependent RNA polymerase inhibitor, or any combination thereof.

26. The method of claim 25, wherein the monoclonal antibody comprises bamlanivimab, etesevimab, casirivimab, imdevimab, sotrovimab, or a combination thereof.

27. The method of claim 25, wherein the protease inhibitor comprises nirmatrelvir, ritonavir, or a combination thereof.

28. The method of claim 25, wherein the RNA-dependent RNA polymerase inhibitor, is an active metabolite of remdesivir.

* * * * *